(12) United States Patent
Kozu et al.

(10) Patent No.: US 8,783,977 B2
(45) Date of Patent: Jul. 22, 2014

(54) LIGHT-QUANTITY CONTROL APPARATUS AND OPTICAL APPARATUS

(71) Applicant: Canon Denshi Kabushiki Kaisha, Chichibu (JP)

(72) Inventors: Satoshi Kozu, Tokyo (JP); Naoki Kawakubo, Yokohama (JP); Akira Kurosawa, Chichibu-gun (JP); Mitsuo Shibata, Matsudo (JP)

(73) Assignee: Canon Denshi Kabushiki Kaisha, Chichibu-shi (JP)

( * ) Notice: Subject to any disclaimer, the term of this patent is extended or adjusted under 35 U.S.C. 154(b) by 0 days.

(21) Appl. No.: 14/146,380

(22) Filed: Jan. 2, 2014

(65) Prior Publication Data

US 2014/0119719 A1 May 1, 2014

Related U.S. Application Data

(63) Continuation of application No. PCT/JP2012/004373, filed on Jul. 5, 2012.

(30) Foreign Application Priority Data

Jul. 7, 2011 (JP) ................................. 2011-150673
Jun. 6, 2012 (JP) ................................. 2012-128808

(51) Int. Cl.
*G03B 9/08* (2006.01)

(52) U.S. Cl.
USPC ......................................................... 396/449

(58) Field of Classification Search
USPC ......................................................... 396/449
See application file for complete search history.

(56) References Cited

U.S. PATENT DOCUMENTS

| 7,085,032 B2 | 8/2006 | Sato |
| 8,009,343 B2 | 8/2011 | Gellrich et al. |
| 8,405,894 B2 * | 3/2013 | Saito .............................. 359/227 |
| 2006/0033974 A1 | 2/2006 | Sato |

(Continued)

FOREIGN PATENT DOCUMENTS

| JP | 2-153334 A | 6/1990 |
| JP | 2004-184486 A | 7/2004 |
| JP | 2005-84605 A | 3/2005 |
| JP | 2006-53409 A | 2/2006 |
| JP | 2007-500869 A | 1/2007 |
| JP | 2007-94074 A | 4/2007 |

(Continued)

OTHER PUBLICATIONS

Sep. 11, 2012 International Search Report in International Patent Appln. No. PCT/JP2012/004373.

*Primary Examiner* — Rodney Fuller
(74) *Attorney, Agent, or Firm* — Fitzpatrick, Cella, Harper & Scinto

(57) ABSTRACT

The light-quantity control apparatus includes a stop blade including a stop portion and a supported portion rotatably supported with respect to a base member, a shutter blade having a shutter portion and a supported portion rotatably supported with respect to the base member, and a driving member disposed between the shutter and stop blades and rotating around the light-passing aperture to rotate the stop blade. The stop and shutter blades have tilts in their supported portions toward a same one side in the optical axis direction so that the stop and shutter portions are distant from the supported portions in the optical axis direction. The driving member has a shape concave toward the one side from its outer circumferential side portion to its inner circumferential side portion. A concave space facing the light-passing aperture is formed inside than the stop and shutter blades and the driving member.

22 Claims, 11 Drawing Sheets

(56) References Cited

U.S. PATENT DOCUMENTS

| | | |
|---|---|---|
| 2009/0021820 A1 | 1/2009 | Gellrich et al. |
| 2011/0176798 A1* | 7/2011 | Kuroki .......................... 396/448 |
| 2011/0222845 A1* | 9/2011 | Osoniwa et al. ............. 396/510 |
| 2013/0300913 A1* | 11/2013 | Sakai ........................... 348/344 |

FOREIGN PATENT DOCUMENTS

| | | |
|---|---|---|
| JP | 2007-310412 A | 11/2007 |
| JP | 2009-204423 A | 9/2009 |
| WO | 2005/019878 A1 | 3/2005 |
| WO | 2013/005439 A1 | 1/2013 |

* cited by examiner

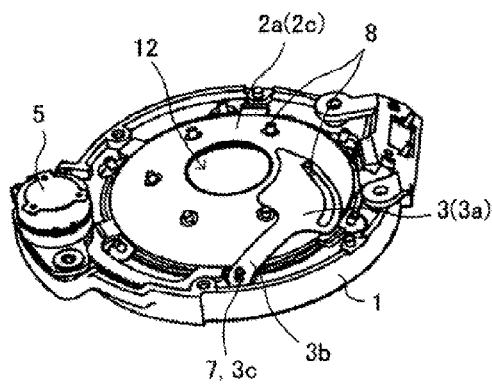 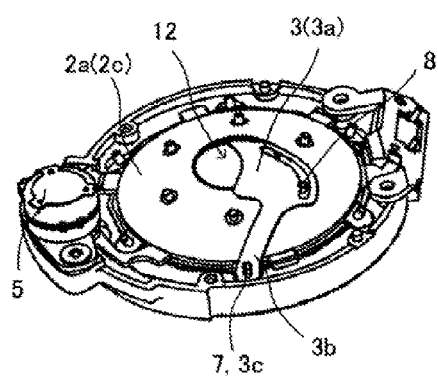
FIG. 5A    FIG. 5B
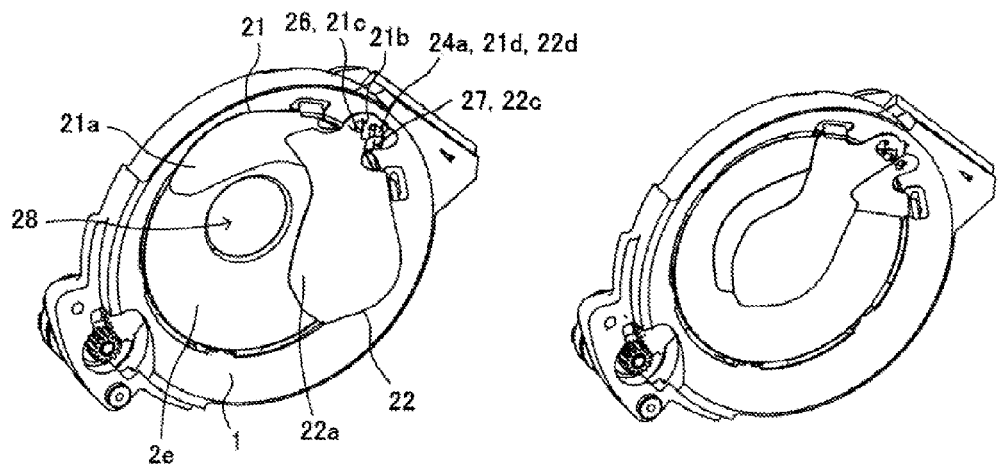
FIG. 6A    FIG. 6B

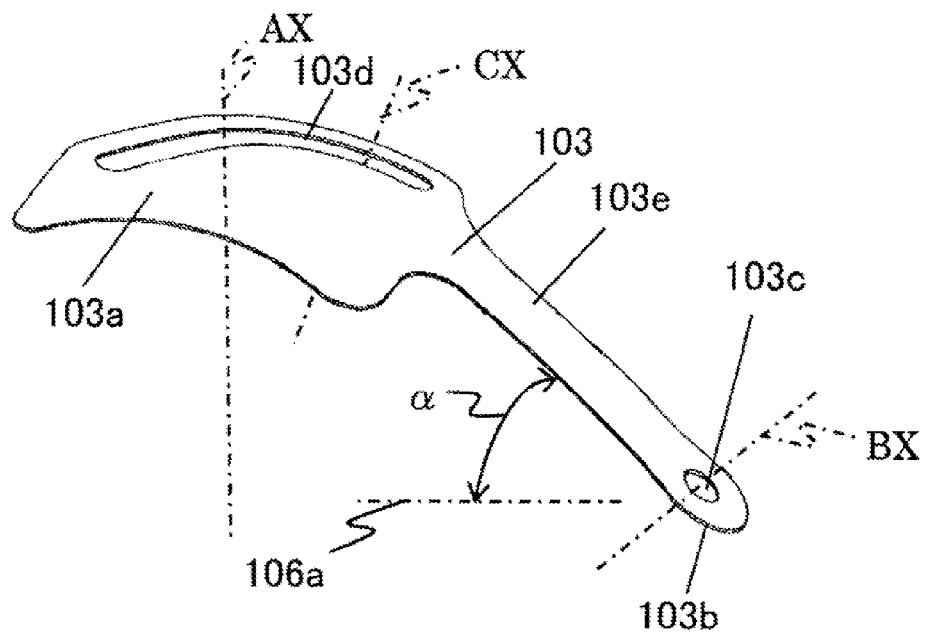
FIG. 12
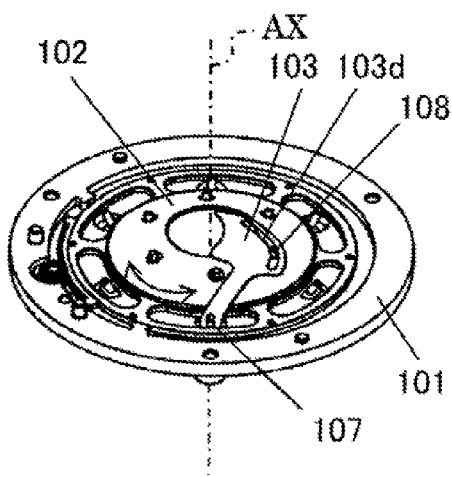
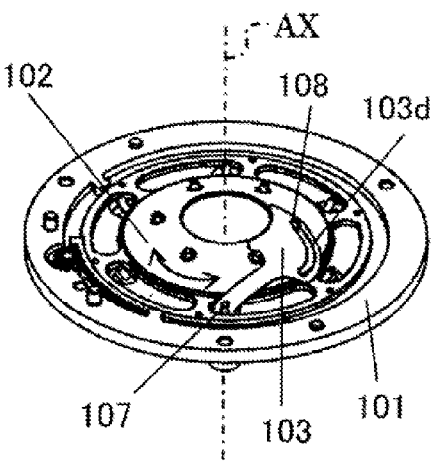
FIG. 13A  FIG. 13B

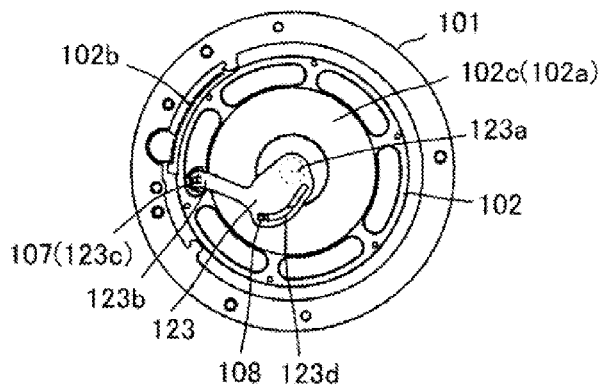 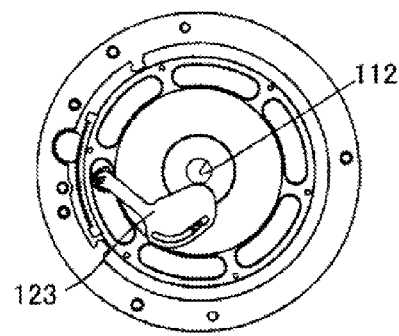
FIG. 14A  FIG. 14B
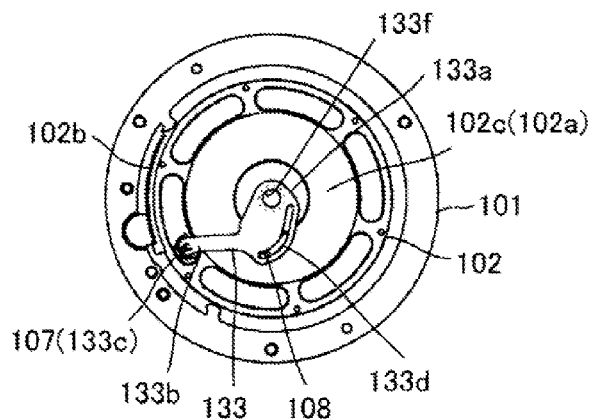 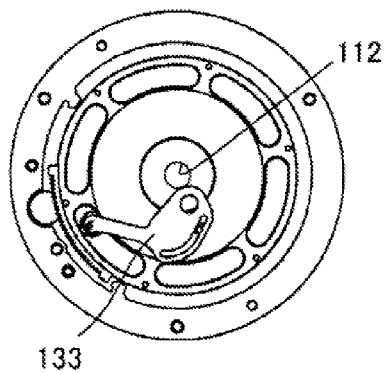
FIG. 15A  FIG. 15B

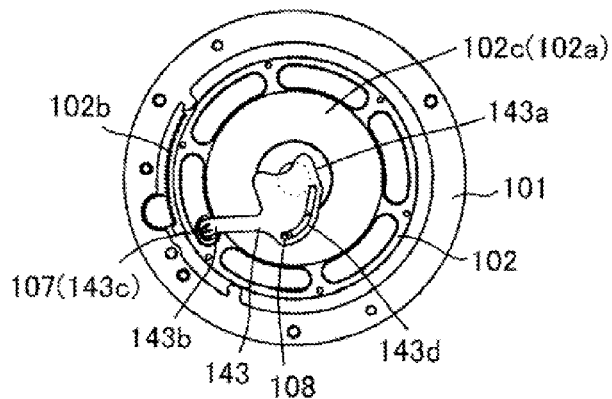 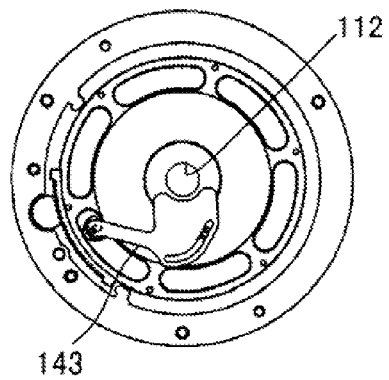
FIG. 16A  FIG. 16B
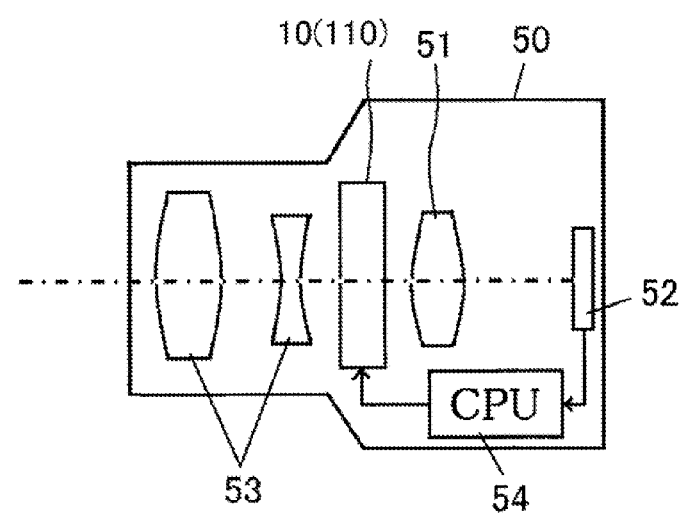
FIG. 17 ity control apparatus increases in its radial direction. In addition, in the light-quantity control apparatus disclosed in Japanese Patent Laid-Open No. 2004-184486, it is also necessary to provide a thickness of the base plate in the optical axis direction, a space for moving the stop blade, and a space for moving the shutter blade. Therefore, miniaturization is restricted.

LIGHT-QUANTITY CONTROL APPARATUS AND OPTICAL APPARATUS

CROSS-REFERENCE TO RELATED APPLICATIONS

This application is a continuation of International Patent Application No. PCT/JP2012/004373, filed on Jul. 5, 2012 which is hereby incorporated by reference herein in its entirety as if fully set forth herein.

BACKGROUND OF THE INVENTION

1. Field of the Invention

The present invention relates to a light-quantity control apparatus having at least one of an aperture stop function and a shutter function. The light-quantity control apparatus is installed in an optical apparatus such as a digital camera, a video camera and an interchangeable lens.

2. Description of the Related Art

An optical apparatus such as a camera is necessary to have compactness. In particular, when a lens barrel for holding an image capturing lens protrudes from a camera body in its optical axis direction, it is necessary to reduce a length of the lens barrel in the optical axis direction as short as possible. Japanese Patent Laid-Open No. 2007-310412 discloses a camera having a so-called retractable lens barrel that protrudes from a camera body during a camera use time (image capturing) and is housed (retracted) to the camera body during a camera non-use time (carrying). In this camera, an aperture stop serving as the light-quantity control apparatus and a lens are arranged adjacently to each other in an optical axis direction. Therefore, the length of the lens barrel in the retracted state is reduced by inserting a part of the lenses into the aperture in the retracted state.

Japanese Patent Laid-Open No. 2004-184486 discloses a light-quantity control apparatus in which a plurality of stop blades for controlling a quantity of light by controlling a size of a light-passing aperture (stop aperture) and a driving ring for opening/closing the stop blades are arranged between a base plate and a partition plate, and in which a shutter blade for opening/closing the light-passing aperture (shutter aperture) is arranged between the partition plate and a cover plate. In this apparatus, a cam boss portion provided in the stop blade engages with a cam groove portion formed in the driving ring, and the stop blade is opened and closed by rotation of the driving ring around the light-passing aperture with respect to the base plate. In addition, the shutter blade is opened and closed by a motor installed to the base plate. In this manner, a light-quantity control apparatus having an aperture stop function and a shutter function is implemented using a single base plate. Therefore, a camera can be miniaturized in an optical axis direction, compared to a case where the aperture stop apparatus and the shutter apparatus are separately provided.

However, in the camera disclosed in Japanese Patent Laid-Open No. 2007-310412, part of the lenses are inserted into the aperture formed by opening the stop blade wider than its opened state. For this reason, it is necessary to enlarge a fully opened aperture diameter to be larger than, at least, an outer diameter of the lens. As a result, it is necessary to enlarge the stop blade used to form the stop aperture. In addition, it is also necessary to prepare an outer circumferential space for retracting the stop blade when the stop blade is opened wider than its opened state. Therefore, a size of the light-quantity control apparatus increases in its radial direction. In addition, in the light-quantity control apparatus disclosed in Japanese In this regard, in the shutter apparatus disclosed in Japanese Patent Laid-Open No. 2-153334, two shutter blades are formed in a curved (spherical) shape, and the shutter blades are moved in their open and close direction along a concave space (hemispherical space) facing their concave surface. In this configuration, it is possible to reduce an outer circumferential space for retracting the shutter blades in a shutter fully opened state, compared to a case where each shutter blade is formed in a planar shape. Therefore, it is possible to miniaturize the shutter apparatus in its radial direction. Such a configuration can be applied to a light-quantity control apparatus for opening and closing a plurality of stop blades. In the configuration employing spherical surface shaped stop blades, it is possible to insert a lens into an concave space formed inside the stop blades or place a concave surface of the lens along convex surface of the stop blades, even when the stop blades are closed (for example, refer to Japanese Patent Laid-Open No. 2007-94074). Therefore, it is possible to reduce a thickness in the optical axis direction when the retractable lens barrel in which the light-quantity control apparatus and the lens are adjacently arranged is retracted.

SUMMARY OF THE INVENTION

However, in the light-quantity control apparatus having the stop blade and the shutter blade disclosed in Japanese Patent Laid-Open No. 2004-184486, even when the stop blade is formed in a spherical surface shape as disclosed in Patent Documents 3 and 4, an inner diameter of the driving ring having a flat plate shape in which a cam groove portion extending in its radial direction is formed is small. Therefore, an aperture diameter as a concave space is also small. For this reason, a diameter of the lens insertable into the concave space is restricted, or the lens is inserted thereinto only part of the convex surface of the lens.

In addition, when the cam boss portion provided in the stop blade penetrates the cam groove portion of the driving ring to protrude on an opposite side to the driving ring, the protruding cam boss portion may hinder the lens from being inserted into the concave space. That is, it is difficult to make the light-quantity control apparatus and the lens adjacent thereto sufficiently close to each other and to miniaturize the lens barrel in the retracted state.

Furthermore, if the shutter blades are formed in the spherical surface shape as disclosed in Patent Documents 3 and 4 when edges of the shutter blades are located to be distant from each other in their open direction in the shutter fully opened state as disclosed in Japanese Patent Laid-Open No. 2004-184486, the shutter blades may be easily caught with each other during a shutter close operation. As a result, the shutter close operation may not be smoothly performed.

The present invention provides a light-quantity control apparatus having a light-quantity control blade formed in a curved or bent shape and thereby enabling sufficient reduction of a thickness of an optical apparatus including the light-quantity control apparatus in its optical axis direction and allowing a smooth shutter operation. The present invention also provides an optical apparatus including the above light-quantity control apparatus.

The present invention provides one aspect thereof a light-quantity control apparatus provided with a light-passing aperture. The apparatus includes a base member, a stop blade including a stop portion to change a quantity of light passing through the light-passing aperture and a stop blade-supported portion rotatably supported with respect to the base member, a shutter blade having a shutter portion to block the light passing through the light-passing aperture and a shutter blade-supported portion rotatably supported with respect to the base member, and a driving member disposed between the shutter blade and the stop blade and rotating with respect to the base member around the light-passing aperture to rotate the stop blade. When a direction orthogonal to an aperture plane of the light-passing aperture is defined as an optical axis direction, and a direction orthogonal to the optical axis direction is defined as a radial direction, the stop blade and the shutter blade respectively have tilts in the stop blade-supported portion and the shutter blade-supported portion toward a same one side in the optical axis direction with respect to the aperture plane so that the stop portion and the shutter portion are respectively distant from the stop blade-supported portion and the shutter blade-supported portion in the optical axis direction, the driving member has a shape concave toward the one side from its outer circumferential side portion to its inner circumferential side portion, and thereby a concave space facing the light-passing aperture is formed inside in the radial direction than the stop blade, the shutter blade and the driving member.

The present invention provides another aspect thereof a light-quantity control apparatus provided with a light-passing aperture. The apparatus includes a base member, a stop blade including a stop portion to change a quantity of light passing through the light-passing aperture and a stop blade-supported portion rotatably supported with respect to the base member, and a first shutter blade and a second shutter blade each having a shutter portion to block the light passing through the light-passing aperture and a shutter blade-supported portion rotatably supported with respect to the base member. When a direction orthogonal to an aperture plane of the light-passing aperture is defined as an optical axis direction, and a direction orthogonal to the optical axis direction is defined as a radial direction, the stop blade and the first and second shutter blades respectively have tilts in the stop blade-supported portion and the shutter blade-supported portions toward a same one side in the optical axis direction with respect to the aperture plane so that the stop portion and the shutter portions are respectively distant from the stop blade-supported portion and the shutter blade-supported portions in the optical axis direction, and thereby a concave space facing the light-passing aperture is formed inside in the radial direction than the stop blade and the first and second shutter blades, the first and second shutter blades each have a curved surface shape or a bent shape so that the tilt with respect to the aperture plane is reduced from the shutter blade-supported portion to the shutter portion, the first shutter blade is disposed so as to overlap the second shutter blade on an opposite side to the concave space, and a curvature of the curved surface shape of the first shutter blade or a bend angle of the bent shape of the first shutter blade with respect to an extension of its shutter blade-supported portion is larger than that of the second shutter blade.

The present invention provides still another aspect thereof a light-quantity control apparatus provided with a light-passing aperture. The apparatus includes a base member, a light-quantity control blade including a light-quantity control portion to change a quantity of light passing through the light-passing aperture and a supported portion rotatably supported with respect to the base member, and a driving member rotating with respect to the base member around the light-passing aperture to rotate the light-quantity control blade. When a direction orthogonal to an aperture plane of the light-passing aperture is defined as an optical axis direction, and a direction orthogonal to the optical axis direction is defined as a radial direction, the light-quantity control blade have tilts in the supported portion toward one side in the optical axis direction with respect to the aperture plane so that the light-quantity control portion is distant from the supported portion in the optical axis direction, the driving member has a shape concave toward the one side from its outer circumferential side portion to its inner circumferential side portion, and thereby a concave space facing the light-passing aperture is formed inside in the radial direction than the light-quantity control blade and the driving member.

The present invention provides yet still another aspect thereof an optical apparatus. The apparatus includes an optical system including a lens and the above light-quantity control apparatus. At least part of the lens is insertable inside the concave space.

Other aspects of the present invention will become apparent from the following description and the attached drawings.

BRIEF DESCRIPTION OF THE DRAWINGS

FIGS. 5A and 5B are explanatory diagrams illustrating operations of the stop blade in Embodiment 1.

FIGS. 6A and 6B are explanatory diagrams illustrating operations of the shutter blade in Embodiment 1.

FIG. 12 is a perspective view illustrating the stop blade used in the aperture stop apparatus of Embodiment 2.

FIGS. 13A and 13B are explanatory diagrams illustrating operations of the aperture stop apparatus of Embodiment 2.

FIGS. 14A and 14B are rear views illustrating an aperture stop apparatus that is Embodiment 3 of the present invention.

FIGS. 15A and 15B are rear views illustrating an aperture stop apparatus that is Embodiment 4 of the present invention.

FIGS. 16A and 16B are rear views illustrating an aperture stop apparatus that is Embodiment 5 of the present invention.

FIG. 17 is a block diagram illustrating a configuration of a camera provided with the aperture stop/shutter apparatus or the aperture stop apparatus of any one of Embodiments 1 to 6.

DESCRIPTION OF THE EMBODIMENTS

Exemplary embodiments of the present invention will hereinafter be described with reference to the accompanying drawings.

Embodiment 1

Figure 1:
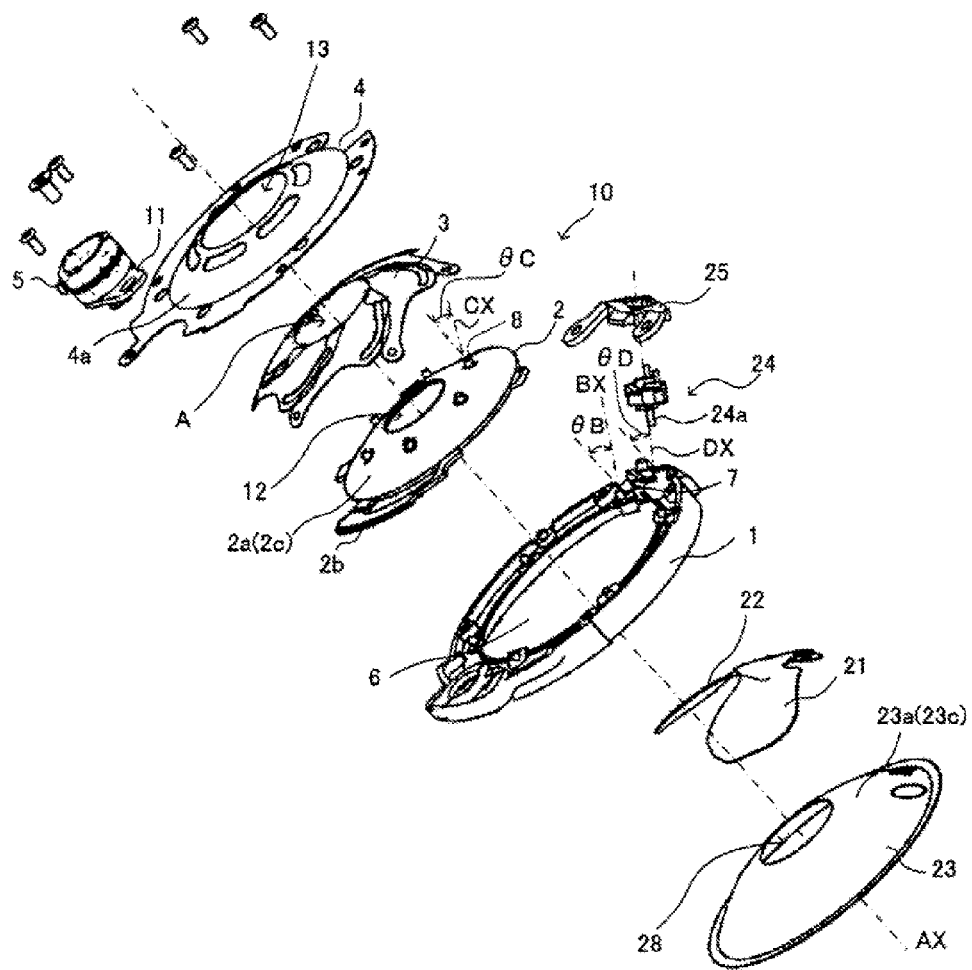
FIG. 1 is an exploded perspective view illustrating an aperture stop/shutter apparatus that is Embodiment 1 of the present invention.
Figure 2A:
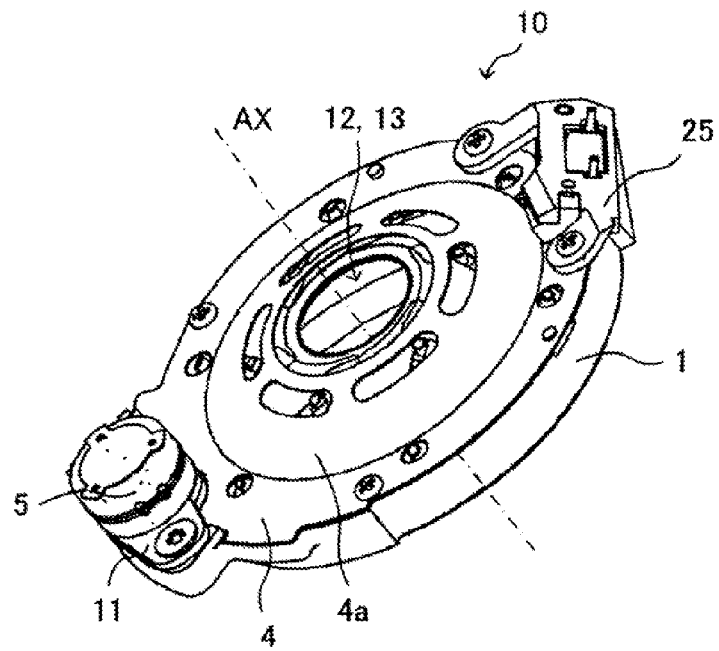
FIGS. 2A and 2B are rear perspective views illustrating the aperture stop/shutter apparatus of Embodiment 1.
Figure 2B:
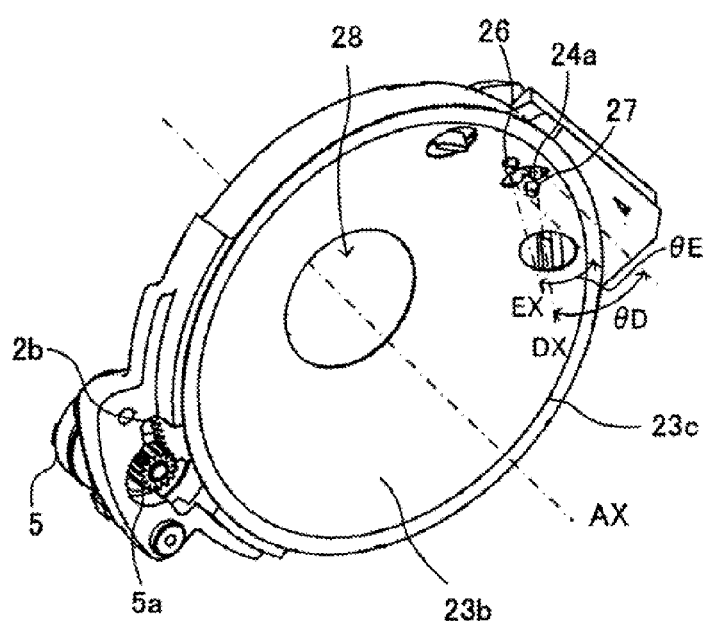

FIGS. 1, 2A and 2B illustrate an iris type aperture stop/shutter apparatus 10 as a light-quantity control apparatus that is Embodiment 1 of the present invention. In these drawings, a base plate 1 as a base member formed in a ring shape has an opening 6 formed in an inner circumferential part thereof. In the following description, an axis passing through a center of the aperture stop/shutter apparatus 10 and orthogonal to an opening plane of the opening 6 formed in the base plate 1 and an aperture plane of each fixed aperture described below is referred to as "an optical axis AX," and a direction where the optical axis AX extends is referred to as "an optical axis direction." In addition, a direction orthogonal to the optical axis direction is referred to as "a radial direction." A stop blade-supporting boss portion (protruding portion) 7 as a stop blade-supporting portion is formed at each of a plurality of circumferential places of a ring portion surrounding the opening 6 of the base plate 1. A center axis BX of each stop blade-supporting boss portion 7 has a tilt angle θB with respect to the optical axis direction (optical axis AX).

A stop driving ring 2 serves as a driving member. The stop driving ring 2 has a domical wall portion 2a formed in a domical shape concave toward the base plate 1 (opening 6) (in other words, convex toward an opposite side to the base plate 1). A first fixed aperture 12 as a light-passing aperture is formed in an innermost circumferential portion (diametric center portion) of the domical wall portion 2a. In addition, a driven gear 2b is formed in a circumferential part of an outer circumferential side portion of the aperture-stop driving ring 2 than the domical wall portion 2a. In the domical wall portion 2a, a concave surface on a base plate (1) side and a convex surface (hereinafter, referred to as "a stop guide surface") 2c on an opposite side thereto are respectively formed in a curved surface shape (for example, a spherical surface shape). A position of the aperture plane of the first fixed aperture 12 in the optical axis direction is distant from the base plate 1 (that is, the opening plane of the opening 6) as compared to an outer circumferential edge of the domical wall portion 2a of the aperture-stop driving ring 2. That is, in the aperture-stop driving ring 2, the domical wall portion 2a is formed so as to protrude in a direction distant from the base plate 1 in the optical axis direction (that is, so as to have a shape concave toward one side in the optical axis direction from an outer circumferential side portion of the stop driving ring 2 to an inner circumferential side portion thereof).

In addition, a cam boss portion 8 is formed at each of a plurality of circumferential places of the stop guide surface 2c (circumferential places around the first fixed aperture 12) of the domical wall portion 2a. A center axis CX of each cam boss portion 8 has a tilt angle θC with respect to the optical axis direction (optical axis AX) extending in a direction normal to the stop guide surface 2c.

Reference numeral 3 denotes a stop blade serving as a light-blocking blade. In this embodiment, a plurality of the stop blades 3, specifically six stop blades 3, are provided. Each stop blade 3 is a thin plate member having a light-blocking property for forming, radially inside the first fixed aperture 12 formed in the stop driving ring 2, a stop aperture A whose circumference is a light-blocking area.

Figure 4A:
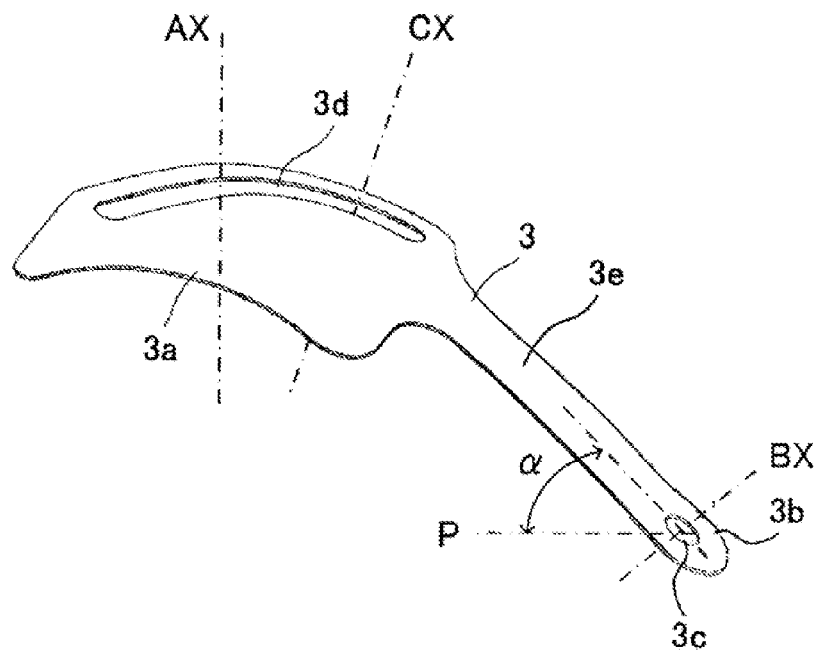
FIGS. 4A and 4B are perspective views illustrating a stop blade and a shutter blade used in the aperture stop/shutter apparatus of Embodiment 1.

As illustrated in FIG. 4A in detail, each stop blade 3 includes a stop portion 3a as a light-blocking portion for forming a stop aperture A and a stop blade-supported portion 3b having a hole portion 3c into which the stop blade-supporting boss portion 7 of the base plate 1 is inserted. The stop blade-supported portion 3b (that is, the stop blade 3) is supported with respect to the base plate 1, by insertion of the stop blade-supporting boss portion 7 into the hole portion 3c, rotatably about the stop blade-supporting boss portion 7. In addition, the stop blade 3 has an intermediate portion 3e that connects the stop portion 3a and the stop blade-supported portion 3b.

Each stop blade 3 is disposed so as to face (or extend along) the stop guide surface 2c of the domical wall portion 2a of the stop driving ring 2. The stop portion 3a is formed in a curved surface shape (for example, a spherical surface shape) having a curvature substantially the same as that of the stop guide surface 2c of the domical wall portion 2a. For this reason, when the stop blade 3 is rotated, the stop portion 3a is rotated in a direction to advance and retract into and from an radially inside area of the first fixing aperture 12 (area facing the first fixed aperture 12), that is, a direction to change a size of the stop aperture A while the stop portion 3a is rotated along the stop guide surface 2c, in other words, by being guided by the stop guide surface 2c. The above advancing/retracting direction is hereinafter referred to as "a stop opening/closing direction."

The intermediate portion 3e and the stop blade-supported portion 3b of each stop blade 3, that is, at least a stop blade-supported portion (3b) side part than the stop portion 3a has a tilt α toward the optical axis direction with respect to the aperture plane (indicated as "P" in FIG. 4A) of the opening 6 of the base plate 1. This tilt α corresponds to a tilt with respect to the aperture plane of the first fixed aperture 12 formed in the stop driving ring 2 and to a tilt with respect to the aperture plane of a second fixed aperture formed in a stop cover plate described below. Furthermore, since each aperture plane is formed along the radial direction, the tilt α can also be referred to as a tilt with respect to the radial direction.

The tilt α is set to be equal to or lower than 90°. Giving the tilt α to the intermediate portion 3e and the stop blade-supported portion 3b causes the stop portion 3a to be located distant from the stop blade-supported portion 3b in the optical axis direction. In addition, a center axis of the hole portion 3c formed in the stop blade-supported portion 3b has a tilt with respect to the optical axis AX so as to match the center axis BX of the stop blade-supporting boss portion 7. Therefore, the stop blade 3 can smoothly rotate, compared to a case where the center axis of the stop blade-supporting boss portion 7 extends in the optical axis direction.

It is noted that, in each stop blade 3, the tilt of the stop blade-supported portion 3b toward the optical axis direction with respect to the aperture plane (radial direction) P is larger than that of the stop portion 3a. In other words, the tilt of the stop portion 3a toward the optical axis direction with respect to the aperture plane P is smaller than that of the stop blade-supported portion 3b. In addition, the entire stop blade 3 from the stop blade-supported portion 3b to the stop portion 3a may be formed in a curved surface shape (for example, a spherical surface shape).

Furthermore, each stop blade 3 has a cam groove portion 3d into which the cam boss portion 8 formed in the stop driving ring 2 is inserted and with which the cam boss portion 8 is engaged. As described above, the center axis CX of the cam boss portion 8 extends in the direction normal to the stop guide surface 2c. For this reason, compared to a case where the center axis of the cam boss portion 8 extends in the optical axis direction, the cam boss portion 8 can smoothly move in the cam groove portion 3d, and the stop portion 3a (i.e., the stop blade 3) can be rotated in the stop opening/closing direction with good position accuracy. It is noted that the stop portion 3a is formed in a curved surface shape (for example, a spherical surface shape) and the stop guide surface 2c may be formed in a truncated conical surface shape instead of the curved surface shape.

In FIGS. 1 and 2A, a stop cover plate (stop cover member) 4 is disposed on an opposite side to the base plate 1 with respect to the stop driving ring 2 and the stop blades 3 to form a stop blade room for housing the stop blades 3 between the stop cover plate 4 and the stop driving ring 2 (domical wall portion 2a). The stop cover plate 4 includes a domical wall portion 4a having a domical shape concave toward the base plate side (opening (6) side), in other words, convex toward the opposite side to the base plate 1, and a ring portion formed in an outer circumferential portion of the domical wall portion 4a. The domical wall portion 4a is formed in a spherical surface shape or a curved surface shape having approximately the same curvature as that of the domical wall portion 2a of the stop driving ring 2.

A second fixed aperture 13 as a light-passing aperture is formed in an innermost circumferential portion (diametric center portion) of the domical wall portion 4a. An aperture plane of the second fixed aperture 13 is located distant from the base plate 1 (opening 6) in the optical axis direction relative to an outer circumferential edge of the domical wall portion 4a. That is, in the stop cover plate 4, the domical wall portion 4a is formed so as to protrude in a direction distant from the base plate 1 in the optical axis direction.

The ring portion of the stop cover plate 4 is coupled with the base plate 1 using screws, and thereby the stop cover plate 4 is integrated with the base plate 1. For this reason, similar to the base plate 1, the stop cover plate 4 may also serve as a base member.

It is noted that the stop cover plate 4 may be omitted by forming a domical wall portion similar to the domical wall portion 4a of the stop cover plate 4 in the base plate 1 and forming a fixed aperture in the domical wall portion of the base plate.

Reference numeral 5 denotes a stop driver including an actuator such as a stepping motor. A driving gear 5a meshing with the driven gear 2b of the stop driving ring 2 is fixed to an output shaft of the stepping motor as illustrated I FIG. 2B. The stop driver 5 is fixed (installed) to the base plate 1 via a motor base plate 11 and the stop cover plate 4. The stop driver 5 is disposed at one place in an outer circumferential portion of the base member including the base plate 1 and the stop cover plate 4 than the domical wall portion 4a. In other words, the stop driver 5 is disposed so as to protrude from its surrounding portions in a same direction as that where the domical wall portion 4a protrudes with respect to its surrounding portions.

In this manner, the domical wall portion 4a and the stop driver 5 have the same protruding direction from the base member. Thereby, as in a case where the aperture stop/shutter apparatus 10 is mounted on an optical apparatus such as a camera as described in Embodiment 2 below, it is possible to effectively use a space inside the optical apparatus (particularly, a space on an opposite side to that where the domical wall portion 4a and the stop driver 5 are arranged), which enables miniaturizing the optical apparatus.

When the stop driver 5 is energized and thereby the driving gear 5a is rotated, as illustrated in FIGS. 5A and 5B, a rotational force from the stop driver 5 is transmitted to the stop driving ring 2 through the driving gear 5a and the driven gear 2b and rotates the stop driving ring 2 about the optical axis AX (around the light-passing aperture) with respect to the base plate 1. With the rotation of the stop driving ring 2, the cam boss portion 8 provided in the stop driving ring 2 moves in the cam groove portion 3d formed in the stop portion 3a of each stop blade 3. Therefore, each stop blade 3 is rotated in the stop opening/closing direction about the stop blade-supporting boss portion 7 inserted into the hole portion 3c of the stop blade-supported portion 3b. In this manner, the rotation of the stop portions 3a of the stop blades 3 (only one stop blade 3 is illustrated in FIGS. 5A and 5B) in the stop opening/closing direction changes a diameter of the stop aperture A formed by the stop portions 3a, which increases and decreases (controls) a quantity of light passing through the stop aperture A.

It is noted that, although this embodiment described the case where (the center axis of) the stop blade-supporting boss portion 7 formed in the base plate 1 and (the center axis of) the cam boss portion 8 formed in the stop driving ring 2 are tilted with respect to the optical axis direction, the stop blade-supporting boss portion 7 and the cam boss portion 8 may be formed to extend in parallel with the optical axis direction as long as the stop blade 3 (stop blade-supported portion 3b) is rotated with respect to a virtual axis tilted with respect to the optical axis direction.

Moreover, a domical wall portion similar to the domical wall portion 4a of the stop cover plate 4 may be formed in the base plate 1, and a fixed aperture may be formed in the domical wall portion. In addition, a cam boss portion may be formed in an inner surface (concave surface) of the domical wall portion, and a stop blade-supporting boss portion may be formed in the rotatable stop driving ring 2. In this case, the stop blade-supporting boss portion formed in the stop driving ring 2 is inserted into the hole portion 3c formed in the stop blade 3, and the cam boss portion formed in the domical wall portion of the base plate 1 is inserted into the cam groove portion 3d. Also in such a configuration, rotating the stop driving ring 2 can rotate the stop blade 3 in the stop opening/closing direction. In this manner, as long as relative positions of the stop blade-supporting boss portion and the cam boss portion respectively inserted into the hole portion 3c and the cam groove portion 3d of the stop blade 3 are changeable, any one of the stop blade-supporting boss portion and the cam boss portion may be formed in the base plate 1 and the other thereof may be formed in the stop driving ring 2. Even when the stop driving ring 2 directly supports the stop blade-supported portion 3b of the stop blade 3 in this manner, it is common that the stop blade-supported portion 3b is rotatably supported with respect to the base plate 1.

Although this embodiment described the case where the stop blade-supporting boss portion 7 formed in the base plate 1 and the cam boss portion 8 formed in the stop driving ring 2 are respectively inserted into the hole portion 3c and the cam groove portion 3d formed in the stop blade 3, a boss portion corresponding to the stop blade-supporting boss portion and a boss portion corresponding to the cam boss portion 8 may be formed in the stop blade 3 to insert them into a hole portion formed in the base plate 1 and a cam groove portion formed in the stop driving ring 2.

Furthermore, in FIG. 1, reference numerals 21 and 22 denote two shutter blades 21 and 22, which are disposed on an opposite side to the stop blades 3 with respect to the base plate 1 (and the stop driving ring 2). Similar to the stop blade 3, the shutter blade (first shutter blade) 21 and the shutter blade (second shutter blade) 22 are each formed as a thin flat plate member having a light-blocking property.

Reference numeral 23 denotes a shutter cover plate (shutter cover member), which is disposed on an opposite side to the base plate 1 and the stop driving ring 2 with respect to the shutter blades 21 and 22. The shutter cover plate 23 is fixed to the base plate 1 to form a shutter blade room for housing the shutter blades 21 and 22 between the shutter cover plate 23 and the stop driving ring 2 (domical wall portion 2a). The shutter cover plate 23 includes a domical wall portion 23a having a domical shape convex toward the base plate side (opening side), in other words, concave toward the opposite side to the base plate 1, and a ring portion formed in an outer circumferential portion of the domical wall portion 23a. The domical wall portion 23a is formed in a curved surface shape (for example, a spherical surface shape) having approximately the same curvature as that of the domical wall portion 2a of the stop driving ring 2.

A third fixed aperture 28 as a light-passing aperture is formed in an innermost circumferential portion (diametric center portion) of the domical wall portion 23a. In the optical axis direction, the aperture plane of the third fixed aperture 28 is located distant from the base plate 1 (opening 6) relative to an outer circumferential edge portion (ring portion) of the domical wall portion 23a. That is, in the shutter cover plate 23, the domical wall portion 23a is formed so as to protrude in a direction distant from the base plate 1 in the optical axis direction.

The shutter cover plate 23 is integrated with the base plate 1 by bonding the ring portion of the shutter cover plate 23 to the base plate 1. Thus, similar to the base plate 1 and the stop cover plate 4, the shutter cover plate 23 can be treated as a base member.

Figure 4B:
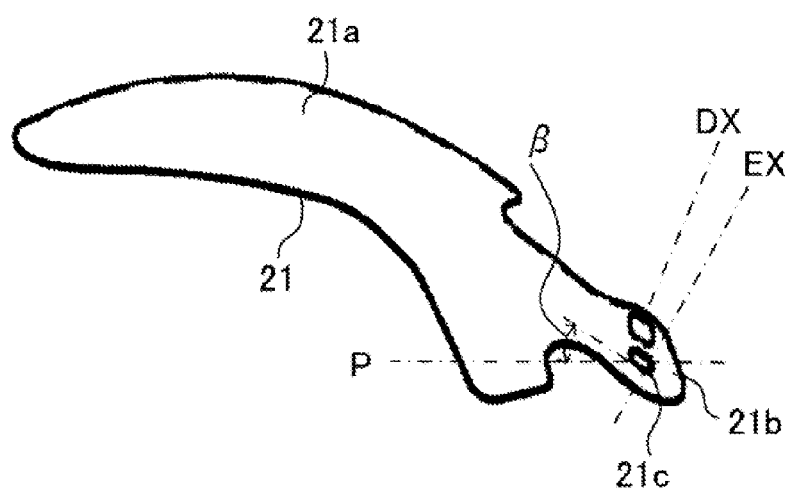

As illustrated in FIG. 4B in detail, the shutter blade 21 includes shutter portion 21a as a light-blocking portion and a shutter blade-supported portion 21b. The shutter portion 21a advances and retracts into and from an area facing the third fixed aperture 28 of the shutter cover plate 23 to open and close the third fixed aperture 28. Closing the third fixed aperture 28 blocks the light passing through the third fixed aperture 28 (and the first and second apertures 12 and 13).

A hole portion 21c is formed in the shutter blade-supported portion 21b, and a shutter blade-supporting boss portion 26 formed in the base plate 1 is inserted into the hole portion 21c. As a result, the shutter blade-supported portion 21b (i.e., shutter blade 21) is supported with respect to the base plate 1 rotatably about the shutter blade-supporting boss portion 26. In addition, a hole portion 21d into which a shutter driving pin described below is inserted and which engages therewith is formed in the shutter blade 21.

The other shutter blade 22 is formed similarly to the shutter blade 21. As illustrated in FIGS. 6A and 6B, the shutter blade 22 includes a shutter portion 22a, a shutter blade-supported portion 22b having a hole portion 22c into which the supporting boss portion is inserted, and a hole portion 22d into which the shutter driving pin is inserted. In FIGS. 6A and 6B, the shutter blades 21 and 22 are illustrated in a state of removing the shutter cover plate 23.

The shutter blades 21 and 22 are disposed to face (or extend along) a concave surface 2e of the domical wall portion 2a of the stop driving ring 2 and a convex surface 23c of the domical wall portion 23a of the shutter cover plate 23. The shutter blades 21 and are each formed in a curved surface shape (for example, a spherical surface shape) having approximately the same curvature as those of the concave surface 2e and the convex surface 23c. Therefore, when the shutter blades 21 and 22 are rotated, the shutter portions 21a and 22a are rotated in a direction to open or close the third fixed aperture 28 (the direction is hereinafter referred to as "a shutter opening/closing direction") along the concave surface 2e of the domical wall portion 2a of the stop driving ring 2 and the convex surface 23c of the domical wall portion 23a of the shutter cover plate 23 while the shutter portions 21a and 22a are guided by the concave surface 2e and the convex surface 23c. The concave surface 2e and the convex surface 23c are hereinafter collectively referred to as "a shutter guide surface."

In this case, the domical wall portion 2a of the stop driving ring 2 also partitions a rotation space for the shutter blades 21 and 22 and a rotation space for the stop blades 3 to avoid interference between the shutter blades 21 and 22 and the stop blades 3. In this manner, the domical wall portion 2a of the stop driving ring 2 has a function of guiding the rotation of the shutter blades 21 and 22 and the stop blades 3 and a function of partitioning the rotation spaces for the shutter blades 21 and 22 and the stop blades 3. Thus, compared to a case where a member for such a guiding function and such a partitioning function described above is provided separately from the stop driving ring 2, it is possible to reduce the number of members or reduce a thickness of the aperture stop/shutter apparatus 10 in the optical axis direction.

A portion of the shutter blades 21 and 22 closer to the supported portions 21b and 22b than the shutter portions 21a and 22a has a tilt $\beta$ toward the optical axis direction with respect to the aperture plane P described above. This tilt $\beta$ is set to be equal to or smaller than 90°. Giving the tilt $\beta$ to the shutter blade-supported portions 21b and 22b causes the shutter portions 21a and 22a to be located distant from the shutter blade-supported portions 21b and 22b in the optical axis direction. It is noted that, in the shutter blades 21 and 22, the tilt $\beta$ of the shutter blade-supported portions 21b and 22b toward the optical axis direction with respect to the aperture plane P is larger than that of the shutter portions 21a and 22a with respect to the aperture plane P. In other words, the tilt of the shutter portions 21a and 22a toward the optical axis direction with respect to the aperture plane P is smaller than that of the shutter blade-supported portions 21b and 22b.

Reference numeral 24 denotes a shutter driver 24 which rotates the shutter blades 21 and 22 in the shutter opening/closing direction. Reference numeral 25 denotes a fixing member 25 which fixes the shutter driver 24 to the base plate 1. The shutter driver 24 includes a positively magnetized magnet, a stator yoke wound around the magnet, a coil for exciting the stator yoke and others. The shutter driver 24 reciprocatingly rotates the magnet between two positions by energization of the coil.

In this embodiment, the shutter driver 24 and the fixing member 25 are installed to a surface of the base plate 1 on an opposite side to that where the shutter blade-supporting boss portions 26 and 27 that support the shutter blade-supported portions 21b and 22b of the shutter blades 21 and 22 are provided (a same side surface to which the stop driver 5 is fixed).

A shutter driving pin 24a is integrally formed in the magnet of the shutter driver 24. The shutter driving pin 24a penetrates through a hole portion formed in the base plate 1 and is inserted into driving hole portions 21d and 22d of the shutter blades 21 and 22 to engage therewith. Therefore, when the shutter driving pin 24a is rotated by energization of the coil, the shutter blades 21 and 22 are rotated in the shutter opening/closing direction about the shutter blade-supporting boss portions 26 and 27 as illustrated in FIGS. 6A and 6B.

The shutter blades 21 and 22 (at least the shutter portions 21a and 22b) are each formed in a spherical surface shape (curved surface shape) having a curvature approximately the same as that of the guide surfaces 2e and 23c of the domical wall portion 2a of the stop driving ring 2 and the domical wall portion 23a of the shutter cover plate 23. For this reason, the shutter blades 21 and 22 are rotated in the shutter opening/closing direction along the guide surfaces 2e and 23c while the shutter blades 21 and 22 are guided by the guide surfaces 2e and 23c.

As illustrated in FIGS. 1 and 4B, a center axis DX of the shutter driving pin 24a has a tilt OD extending in a direction normal to the domical wall portion 23a (guide surface 2e) with respect to the optical axis direction (optical axis AX). In addition, center axes of the driving hole portions 21d and 22d engaging with the shutter driving pin 24a in the shutter blades 21 and 22 each have a tilt with respect to the optical axis AX so as to match the center axis DX of the shutter driving pin 24a. In addition, the shutter blade-supporting boss portions 26 and 27 each have a tilt θE with respect to the optical axis direction (optical axis AX), and center axes of the hole portions 21c and 22c engaging with the shutter blade-supporting boss portions 26 and 27 each have a tilt with respect to the optical axis AX so as to match center axes EX of the shutter blade-supporting boss portions 26 and 27. Therefore, it is possible to more smoothly and rapidly rotate the shutter blades 21 and 22 to perform a shutter operation, compared to a case where the center axes of the shutter driving pin 24a and the shutter blade-supporting boss portions 26 and 27 extend in the optical axis direction.

It is noted that, although this embodiment described the case where the shutter blade-supporting boss portions 26 and 27 formed in the base plate 1 are inserted into the hole portions 21c and 22c formed in the shutter blades 21 and 22, a shutter blade-supporting boss portion may be installed in the shutter cover plate 4. In addition, boss portions corresponding to the shutter blade-supporting boss portions 26 and 27 may be formed in the shutter blades 21 and 22 to insert them into the hole portion formed in the base plate 1.

Figure 3:
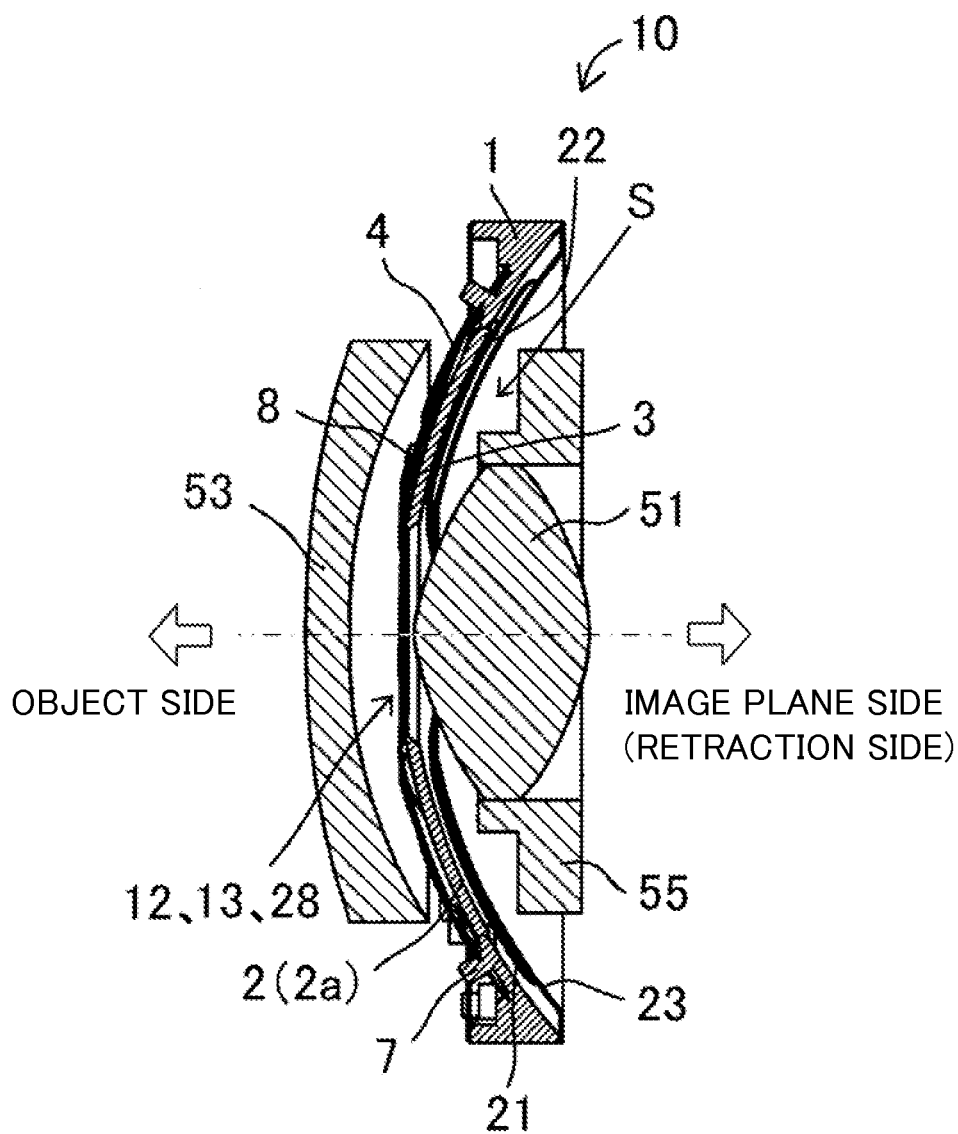
FIG. 3 is a side cross-sectional view illustrating the aperture stop/shutter apparatus of Embodiment 1.

As described above, in the aperture stop/shutter apparatus 10 of this embodiment, the stop- and shutter blade-supported portions 3b, 21b and 22b of the stop and shutter blades 3, 21 and 22 have tilts α and β toward the same one side in the optical axis direction with respect to the aperture plane P such that the stop and shutter portions 3a, 21a and 22a are located distant from the stop- and shutter blade-supported portions 3b, 21b and 22b in the optical axis direction, as illustrated in FIG. 3. In addition, the stop driving ring 2 and the shutter cover plate 23 each have a shape (domical wall portions 2a and 23a) concave toward the one side. As a result, a concave space S facing the first to third fixed apertures (light-passing apertures) 12, 13 and 28 is formed inside in the radial direction than the stop blades 3, the stop driving ring 2, the shutter cover plate 23 and the shutter blades 21 and 22.

In practice, this concave space S is formed in a radially inside of the shutter cover plate 23 having the third fixed aperture 28 as a space having a depth in the optical axis direction toward the first and second fixed apertures 12 and 13 formed in the stop driving ring 2 and the stop cover plate 4. The concave space S on its fixed aperture (12, 13, 28) side opens toward the first to third fixed apertures 12, 13 and 28 (that is, faces the first to third fixed apertures 12, 13 and 28), and the concave space S on an opposite side thereto opens toward an outside of the aperture stop/shutter apparatus 10 in the optical axis direction with its inner diameter increasing toward the opposite side.

As illustrated in FIG. 3, at least part of the lens 51 can be inserted into the concave space S. That is, according to this embodiment, it is possible to form the concave space S, into which at least part of the lens 51 can be inserted, in a radially inner area than the stop and shutter blades 3, 21 and 22 without opening the stop and shutter blades 21 and 22 up to their fully opened state. Moreover, forming the domical wall portions 2a and 23a in the stop driving ring 2 and the shutter cover plate 23 makes it possible to increase an opening diameter of the concave space S where the lens 51 is inserted, compared to a case where the stop driving ring and the shutter cover plate are formed in a flat plate ring shape. That is, it is possible to increase a diameter of the lens 51 insertable into the concave space S. FIG. 3 illustrates a state where a most part of the lens 51 and a lens holding member 55 for holding the lens 51 is inserted into the concave space S.

In this embodiment, one of the stop blades 3 and the shutter blades 21 and 22 (the stop blades 3 in this embodiment) is disposed on an opposite side to the concave space S in the optical axis direction relative to the other one (the shutter blades 21 and 22 in this embodiment), and the stop blades 3 are disposed so as to be convex from the base plate 1 toward the opposite side to the concave space S. Such disposition of the stop blades 3 makes it possible to arrange convex surfaces of the stop blades 3 (the domical wall portion 4a of the stop cover plate 4) and a concave surface of a lens 53, which is disposed on an opposite side to the lens 51 with respect to the aperture stop/shutter apparatus 10, to be close to each other, as illustrated in FIG. 3. Thereby, it is possible to arrange the stop blades 3 and the shutter blades 21 and 22 in a narrow space between a convex surface of the lens 51 and the concave surface of the lens 53.

Furthermore, in this embodiment, the shutter blades 21 and 22, the base plate 1, and the stop blades 3 are arranged in this order in a concave direction of the concave space S (depth direction toward the first to third fixed apertures 12, 13, and 28). In other words, the stop blades 3 are disposed on a convex side where the aperture stop/shutter apparatus 10 is convex toward the optical axis direction, and the shutter blades 21 and 22 are disposed on a concave side where the aperture stop/shutter apparatus 10 is concave. The reason of that is as follows. Since the number of the stop blades 3 (six in this embodiment) is greater than the number of the shutter blades 21 and 22 (two in this embodiment), the number of the stop blade-supporting boss portions 7 formed in the base plate 1 and the number of the cam boss portions 8 formed in the stop driving ring 2 increase accordingly. When such boss portions are formed in the wall portion having a domical shape, they are easily formed on its convex surface than a case where they are formed on its concave surface because a mold structure is simplified, which can improve productivity.

However, in comparison, the shutter blades, the base plate, and the stop blades may be arranged in this order in an opposite direction to the concave direction of the concave space, that is, the stop blades may be disposed on the concave side where the aperture stop/shutter apparatus 10 is concave toward the optical axis direction, and the shutter blades 21 and 22 are disposed on the convex side.

Figure 7A:
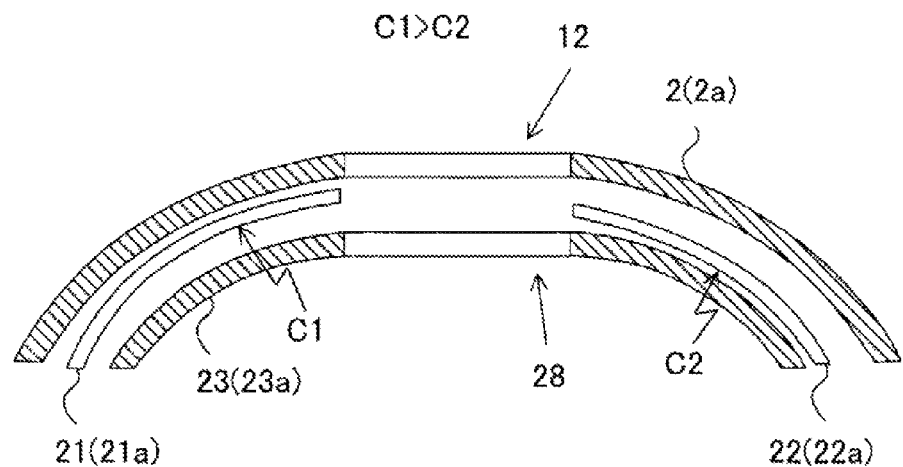
FIGS. 7A and 7B are cross-sectional views illustrating a shutter blade in Embodiment 1.
Figure 7B:
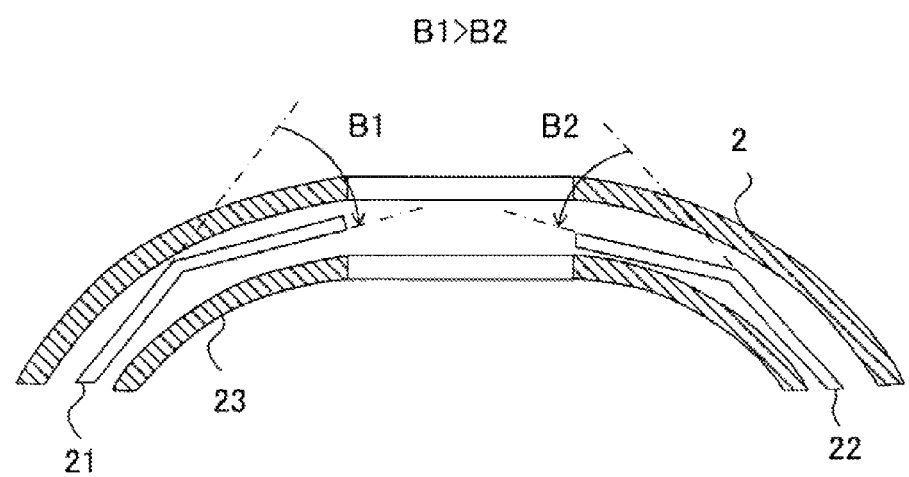

In addition, although this embodiment described the case where the shutter blades 21 and 22 are formed in a curved surface shape smoothly extending from the shutter blade-supported portions 21b and 22b to the shutter portions 21a and 22a, the shutter portions 21a and 22a may have a bent shape with respect to the shutter blade-supported portions 21b and 22b (refer to FIG. 7B). Similarly, in this case, the tilt of the shutter portions 21a and 22a toward the optical axis direction with respect to the aperture plane (P in FIG. 4B) is smaller than that (β in FIG. 4B) of the shutter blade-supported portions 21b and 22b.

FIG. 7A illustrates sectional planes of the stop driving ring 2, the shutter blades 21 and 22 and the shutter cover plate 23. As illustrated in FIG. 7A, a curvature C1 of the curved surface shape of the shutter blade 21 disposed so as to overlap the shutter blade 22 in the opposite side to the concave space S is larger than a curvature C2 of the shutter blade 22. In other words, a radius of curvature of the curved surface shape of the shutter blade 21 is smaller than that of the shutter blade 22.

In this embodiment, as illustrated in FIG. 6A, in the shutter fully opened state, tip side portions of the shutter blades 21 and 22 than the supported portions 21b and 22b are separated from each other in their shutter opening direction so that the tip side portions do not overlap each other in the optical axis direction. For this reason, if the curvatures C1 and C2 of the shutter blades 21 and 22 are equal to each other or the curvature C2 is larger than the curvature C1, the tip side portions of the shutter blades 21 and 22 may be caught with each other in a shutter closing operation. In this regard, as in this embodiment, setting the curvature C1 of the shutter blade 21 to be larger than the curvature C2 of the shutter blade 22 makes it possible to prevent the tip side portions of the shutter blades 21 and 22 from being caught with each other in the shutter closing operation and smoothly perform the shutter closing operation (i.e., a shutter operation).

When the shutter blades 21 and 22 each have a bent shape as described above, for the same reason, the bend angle B1 of the bent shape of the shutter blade 21 with respect to an extension of its shutter blade-supported portion 21b may be set to be larger than the bend angle B2 of the shutter blade 22 with respect to an extension of its shutter blade-supported portion 22b as illustrated in FIG. 7B.

Figure 8:
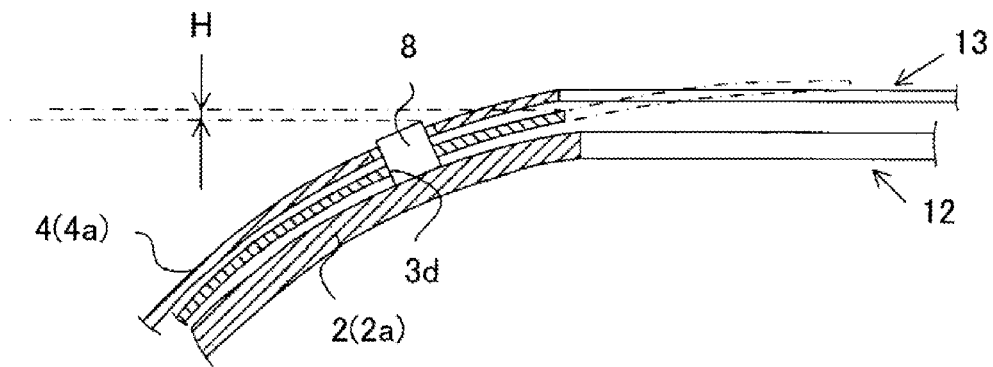
FIG. 8 is a cross-sectional view illustrating a surrounding of the stop blade in Embodiment 1.

FIG. 8 is a partially enlarged sectional view illustrating the stop driving ring 2, the stop blade 3 and the stop cover plate 4. As illustrated in FIG. 8, a tip of the cam boss portion 8 on one side (that is, a convex side where the domical wall portion 2a and the stop blades 3 are convex) in the stop driving ring 2 is located (retracted) on an opposite side to the one side further than an edge of the stop portion 3a on the one side, regardless of a rotate position of the stop blade 3.

Reference symbol H in FIG. 8 denotes a retraction amount of the one side tip of the cam boss portion 8 with respect to the one side edge of the stop portion 3a when the stop blade 3 is opened. When a position of the one side edge of the stop portion 3a in FIG. 8 is referred to as "a height," the height of the one side edge of the stop portion 3a is lowest in this stop opened state. Similarly, in this state, the one side tip of the cam boss portion 8 is retracted at a lower position than the one side edge of the stop portion 3a. In FIG. 8, a dashed-dotted line denotes a position (highest position) of the stop portion 3a when the stop blade 3 is closed. Therefore, the phrase "regardless of the rotate position of the stop blade 3" may be rephrased to "also in the stop opened state".

Such a configuration that the one side tip of the cam boss portion 8 is retracted further than the one side edge of the stop portion 3a regardless of the rotation position of the stop blade 3 enables arranging the convex surface of the stop blade 3 (the domical wall portion 4a of the stop cover plate 4) and the concave surface of the lens 53 to be close to each other as illustrated in FIG. 3, without hindrance of the cam boss portion 8, regardless of an opening/closing state of the stop blade 3 (even in the stop opened state). As a result, it is possible to reduce a gap between the lenses 51 and 53 where the aperture stop/shutter apparatus 10 is interposed.

Embodiment 2

FIG. 17 illustrates a camera (a video camera or a still camera) as an optical apparatus in which the aperture stop/shutter apparatus 10 described in Embodiment 1 is installed. The camera includes a camera body 50, a plurality of lenses 51 and 53 constituting an image capturing optical system, and an image sensor 52 such as a charge-coupled device (CCD) sensor or a complementary metal oxide semiconductor (CMOS) sensor to photo-electrically convert an object image formed by the image capturing optical system.

A controller 54 such as a central processing unit (CPU) controls operations of the drivers 5 and 24 of the aperture stop/shutter apparatus 10 and the image sensor 52.

In such a camera, as described in Embodiment 1 with reference to FIG. 3, at least part (convex surface) of the lens 51 adjacently disposed to the aperture stop/shutter apparatus 10 in the optical axis direction and a lens holding member 55 for holding the lens 51 can be inserted into the concave space S of the aperture stop/shutter apparatus 10.

Assuming that the domical wall portions 2a and 23a are respectively formed in the stop driving ring 2 and the shutter cover plate 23, a size (inner diameter) of an opening serving as an entrance for the lens 51 into the concave space S is defined by a diameter of a circle passing through the stop blade-supported portions 3b (stop blade-supporting boss portions 7) of the stop blades 3 (or an inner diameter of the opening 6 of the base plate 1 corresponding to the circle), which does not depend on a size of the stop aperture A formed by the stop blades 3 (in other words, an opened degree of the shutter blades 21 and 22). Thus, even when the stop aperture A is narrowed, it is possible to insert the lens 51 into the concave space S without setting the stop aperture A to a fully opened aperture diameter or increasing the size of the stop aperture A to a larger size than that of the fully opened aperture diameter. Therefore, it is possible to eliminate necessity of increasing the maximum diameter of the stop aperture A depending on the outer diameter of the lens 51, which avoids increase of the radial size of the aperture stop/shutter apparatus 10 capable of inserting the lens into its inner space.

It is noted that the entrance of the concave space S may be directed toward an object side, and the lens 53 disposed adjacently on the object side may be inserted into the concave space S of the aperture stop/shutter apparatus 10.

Such a configuration enables, in particular, reducing a size of the image capturing optical system of the camera in the optical axis direction.

As described in Embodiment 1, FIG. 3 also illustrates a state that the convex surface (object side surface) of the domical wall portion 4a of the stop cover plate 4 of the aperture stop/shutter apparatus 10 is disposed close to the concave surface (image plane side surface) of the lens 53 adjacently disposed on the object side of the aperture stop/shutter apparatus 10. In this manner, it is possible to dispose the stop blades 3 and the shutter blades 21 and 22 of the aperture stop/shutter apparatus in a narrow space between the object side convex surface of the lens 51 and the image plane side concave surface of the lens 53.

In addition, as illustrated in FIG. 3, a lens barrel holding the image capturing optical system may be housed (retracted) into the camera body in a state where the aperture stop/shutter apparatus 10 is close to the lenses 51 and 53 arranged on both sides thereof.

Furthermore, the aperture stop/shutter apparatus 10 may be installed in other optical apparatuses such as an interchangeable lens as well as the camera illustrated in FIG. 17.

Embodiment 3

Figure 9:
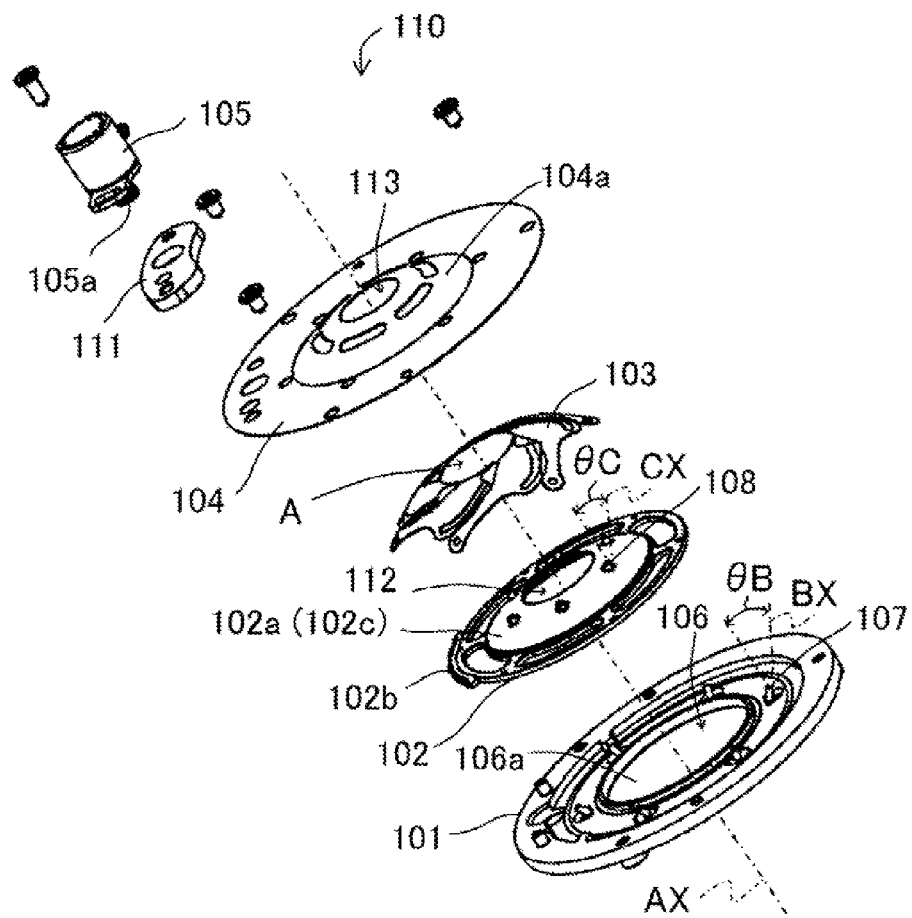
FIG. 9 is an exploded perspective view illustrating an aperture stop apparatus that is Embodiment 2 of the present invention.
Figure 10:
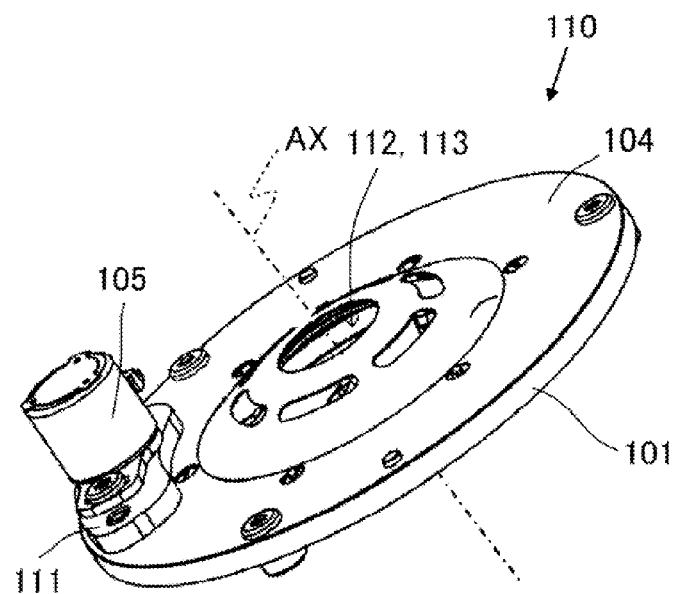
FIG. 10 is a rear perspective view illustrating the aperture stop apparatus of Embodiment 2.

FIGS. 9 and 10 illustrate an iris type aperture stop apparatus 110 as a light-quantity control apparatus that is Embodiment 3 of the present invention. In FIGS. 9 and 10, reference numeral 101 denotes a base plate as a base member in which a first fixed aperture 106 as a fixed light-passing aperture is formed in its radially central portion. In the following description, an axis passing through a center of an aperture plane 106a of the first fixed aperture 106 and orthogonal to the aperture plane 106a is referred to as "an optical axis AX," and a direction where the optical axis AX extends is referred to as "an optical axis direction."

In addition, a supporting boss portion (protruding portion) 107 as a supporting portion is formed at each of a plurality of circumferential places of a ring portion surrounding the first fixed aperture 106 of the base plate 101. A center axis BX of each supporting boss portion 107 has a tilt angle θB with respect to the optical axis direction (optical axis AX).

A driving ring 102 serves as a driving member. The driving ring 102 has a domical wall portion 102a formed in a domical shape concave toward the base plate 101 (first fixed aperture 106) (in other words, formed so as to have a shape concave toward one side in the optical axis direction from its outer circumferential side portion to its inner circumferential side portion). The domical wall portion 102a is formed so as to protrude in a direction distant from the base plate 1 in the optical axis direction. An outer diameter of the domical wall portion 102a is set to be approximately equal to an inner diameter of the first fixed aperture 106 of the base plate 1.

A driven gear 102b is formed in a circumferential part of an outer circumferential side portion of the driving ring 102 than the domical wall portion 102a. In the domical wall portion 102a, a concave surface on a base plate (101) side and a convex surface (hereinafter, referred to as "a guide surface") 102c on an opposite side thereto are respectively formed in a curved surface shape (for example, a spherical surface shape). A second fixed aperture 112 corresponding to a fully opened aperture is formed in a radially central part of the domical wall portion 102a. A position of an aperture plane of the second fixed aperture 112 in the optical axis direction is distant from the base plate 101 (that is, the aperture plane 106a of the first fixed aperture 106) as compared to the outer circumferential portion of the domical wall portion 102a of the aperture-stop driving ring 102.

In addition, a cam boss portion 108 is formed at each of a plurality of circumferential places of the stop guide surface 102c (circumferential places around the second fixed aperture 112) of the domical wall portion 102a. A center axis CX of each cam boss portion 108 has a tilt angle θC with respect to the optical axis direction (optical axis AX) extending in a direction normal to the stop guide surface 102c.

Reference numeral 103 denotes a stop blade serving as a light-quantity control blade (light-blocking blade). In this embodiment, a plurality of the stop blades 103 are provided. Each stop blade 103 is a thin plate member having a light-blocking property for forming, radially inside the first fixed aperture 106 formed in the base plate 101 and the second fixed aperture 112 formed in the driving ring 102, a stop aperture A whose circumference is a light-blocking area.

As illustrated in FIG. 12, each stop blade 103 includes a light-blocking portion 103a as a light-quantity controlling portion (stop portion) for forming the stop aperture A, a supported portion 103b which is supported with respect to the base plate 101 and the driving ring 102, and an intermediate portion 103e that connects the light-blocking portion 103a and the supported portion 103b. A hole portion (concave portion) 103c into which the supporting boss portion 107 formed in the base plate 101 is inserted is formed in the supported portion 103b. The stop blade 103 is rotatable about the supporting boss portion 107 and the hole portion 103c with respect to the base plate 101 and the driving ring 102.

The stop blades 103 are arranged so as to face the guide surface 102c of the domical wall portion 102a of the driving ring 102. The light-blocking portion 103a is formed in a curved surface shape (for example, in a spherical surface shape) having approximately the same curvature as that of the guide surface 102c of the domical wall portion 102a of the driving ring 102. For this reason, when the stop blade 103 is rotated, the light-blocking portion 103a thereof is moved along the guide surface 102c, i.e., by being guided by the guide surface 102c in a direction to advance and retract to and from an radially inside area of the second fixed aperture 112 (area facing the first and second fixed apertures 106 and 112), that is, in a direction to change a size of the stop aperture A, thereby controlling a quantity of light passing through the first and second fixed apertures 106 and 112. The The above advancing/retracting direction is hereinafter referred to as "an opening/closing direction."

In this manner, the domical wall portion 102a of the driving ring 102 has a function of guiding the rotation of the stop blade 103. Therefore, compared to a case where a member having a guide function is provided separately from the driving ring 102, it is possible to reduce the number of members or a thickness of the aperture stop apparatus 110 in the optical axis direction.

Furthermore, each stop blade 103 has a cam groove portion 103d into which the cam boss portion 108 formed in the driving ring 102 is inserted and with which the cam boss portion 108 is engaged. As described above, the center axis CX of the cam boss portion 108 extends in the direction normal to the stop guide surface 102c. For this reason, compared to a case where the center axis of the cam boss portion 108 extends in the optical axis direction, the cam boss portion 108 can smoothly move in the cam groove portion 103d, and the light-blocking portion 103a (i.e., the stop blade 3) can be rotated in the opening/closing direction with good position accuracy. It is noted that the light-blocking portion 103a is formed in a curved surface shape (for example, a spherical surface shape) and the guide surface 102c may be formed in a truncated conical surface shape instead of the curved surface shape.

The intermediate portion 103e and the supported portion 103b of each stop blade 103, that is, at least a supported portion side part than the light-blocking portion 103a has a tilt α toward the optical axis direction with respect to the aperture plane 106a of the first fixed aperture 106 formed in the base plate 101. This tilt α is also a tilt with respect to the aperture plane of the second fixed aperture 112 formed in the driving ring 102 and an aperture plane of a third fixed aperture formed in a cover plate described below. The tilt α is set to be equal to or lower than 90°. Giving the tilt α to the intermediate portion 103e and the supported portion 103b causes the light-blocking portion 103a to be located distant from the supported portion 103b in the optical axis direction. In addition, a center axis of the hole portion 103c formed in the supported portion 103b has a tilt with respect to the optical axis AX so as to match the center axis BX of the supporting boss portion 107. Therefore, the stop blade 103 can smoothly rotate, compared to a case where the center axis of the supporting boss portion 107 extends in the optical axis direction.

It is noted that, in each stop blade 103, the tilt of the supported portion 103b toward the optical axis direction with respect to the aperture plane 106a is larger than that of the light-blocking portion 103a. In other words, the tilt of the light-blocking portion 103a toward the optical axis direction with respect to the aperture plane 106a is smaller than that of the supported portion 103b. In addition, the entire stop blade 103 from the supported portion 103b to the light-blocking portion 103a may be formed in a curved surface shape (for example, a spherical surface shape). Furthermore, the intermediate portion 103e and the light-blocking portion 103a of the stop blade 103 may be formed in a bent shape.

In FIGS. 9 and 10, reference numeral 104 denotes a cover plate (cover member), which forms a blade room for housing the driving ring 102 and the stop blades 103 between the cover plate 104 and the base plate 101. A dome portion (cover portion) 104a having a domical shape concave toward the base plate side is formed in an inner circumferential portion of the cover plate 104.

The dome portion 104a is formed in a curved surface shape (for example, a spherical surface shape) having approximately the same curvature as that of the domical wall portion 102a of the driving ring 102. A third fixed aperture 113 corresponding to a fully opened aperture is formed in a radially central part of the dome portion 104a. In the optical axis direction, a position of an aperture plane of the third fixed aperture 113 is distant from the base plate 101 (that is, the aperture plane 106 of the first fixed aperture 106) compared to an outer circumference portion of the cover plate 104 than the dome portion 104a. In other words, in the cover plate 104, the dome portion 104a is formed so as to protrude toward a light-blocking portion (103a) side from a supported portion (103b) side of the stop blade 3 in the optical axis direction with respect to the outer circumferential portion of the cover plate 104.

The cover plate 104 is coupled to the base plate 101 by screwing its outer circumferential portion to the base plate 101, and thereby the cover plate 104 is integrated with the base plate 101. Therefore, similar to the base plate 101, the cover plate 104 can be treated as a base member. It is noted that a dome portion similar to the dome portion 104a may be formed in the base plate 101, the dome portion 104a of the cover plate 104 may be omitted, and thereby arrangement positions of the base plate 101 and the cover plate 104 may be changed.

Reference numeral 105 denotes a driver 105 which includes an actuator such as a stepping motor. A driving gear 105a meshing with the driven gear 102b of the driving ring 102 is fixed to an output shaft of the stepping motor. The driver 105 is fixed to the base plate 101 via a motor base plate 111 and the cover plate 104. The driver 105 is disposed in an outer circumferential portion of the base member including the base plate 101 and the cover plate 104 than the dome portion 104a. In other words, the driver 105 is disposed so as to protrude from its surrounding portions in a same direction as that where the domical wall portion 104a protrudes with respect to its surrounding portions. In this manner, the dome portion 104a and the driver 105 have the same protruding direction from the base member. Thereby, as in Embodiment 7 described later, when the aperture stop apparatus 110 is mounted on an optical apparatus such as a camera, it is possible to effectively use a space inside the optical apparatus (particularly, a space on an opposite side to that where the dome portion 104a and the driver 105 are arranged), which enables miniaturizing the optical apparatus.

When the driver 105 is energized and thereby the driving gear 105a is rotated, as illustrated in FIGS. 13A and 13B, a rotational force from the driver 5 is transmitted to the driving ring 102 through the driving gear 105a and the driven gear 102b and rotates the driving ring 2 about the optical axis AX with respect to the base plate 101. With the rotation of the driving ring 102, the cam boss portion 108 provided in the driving ring 102 moves in the cam groove portion 103d formed in the light-blocking portion 103a of each stop blade 3. Therefore, each stop blade 3 is rotated in the opening/closing direction about the supporting boss portion 107 inserted into the hole portion 103c of the supported portion 103b.

It is noted that, although this embodiment described the case where (the center axis of) the supporting boss portion 107 formed in the base plate 101 and (the center axis of) the cam boss portion 108 formed in the driving ring 102 are tilted with respect to the optical axis direction, the supporting boss portion 107 and the cam boss portion 108 may be formed to extend in parallel with the optical axis direction as long as the stop blade 103 (supported portion 103b) is rotated with respect to a virtual axis tilted with respect to the optical axis direction.

The cover plate 104 may be formed in the base plate 101, a cam boss portion may be formed in the dome portion of the base plate 101, the driving ring 102 may be rotatably disposed on a radially outer side of a fixed aperture of the dome portion, and the supporting boss portion 107 may be formed in the driving ring 102. In this case, the supporting boss portion 107 formed in the driving ring 102 is inserted into the hole portion 103c formed in the stop blade 103, and the cam boss portion 108 formed in the base plate 101 is inserted into the can groove portion 103d. That is, as long as relative positions of the supporting boss portion 107 and the cam boss portion 108 respectively inserted into the hole portion 103c and the cam groove portion 103d of the stop blade 103 are changeable, any one of the supporting boss portion 107 and the cam boss portion 108 may be formed in the base plate 101 and the other thereof may be formed in the driving ring 102.

Furthermore, although this embodiment described the case where the supporting boss portion 107 formed in the base plate 101 and the cam boss portion 108 formed in the driving ring 102 are respectively inserted into the hole portion 103c and the cam groove portion 103d formed in the stop blade 103, a boss portion corresponding to the supporting boss portion 107 and a boss portion corresponding to the cam boss portion 108 may be formed in the stop blade 103 to insert them into a hole portion formed in the base plate 101 and a cam groove portion formed in the driving ring 102.

As described above, in the aperture stop apparatus 110 of this embodiment, the intermediate portion 103e and the supported portion 103b of each stop blade 103 have a tilt α toward one side of the optical axis direction. In addition, the driving ring 102 has a shape (the domical wall portion 102a) concave toward the one side. As a result, as illustrated in FIG. 11, a concave space S facing the first to third fixed apertures (light-passing apertures) 106, 112 and 113 is formed inside in the radial direction than the stop blades 103 and the driving ring 102.

The concave space S is a space having a depth in the optical axis direction from the supported portion (103b) side of the stop blades 103 to the light-blocking portion (103a) side thereof. A supported portion side end of the concave space S is opened toward the first fixed aperture 106 formed in the base plate 101. Meanwhile, a light-blocking portion side end of the concave space S is opened toward the second fixed aperture 112 formed in the driving ring 102 (in addition, toward the stop aperture A and the third fixed aperture 113 formed in the cover plate 104). That is, the concave space S faces the first to third fixed apertures 106, 112 and 113.

Figure 11:
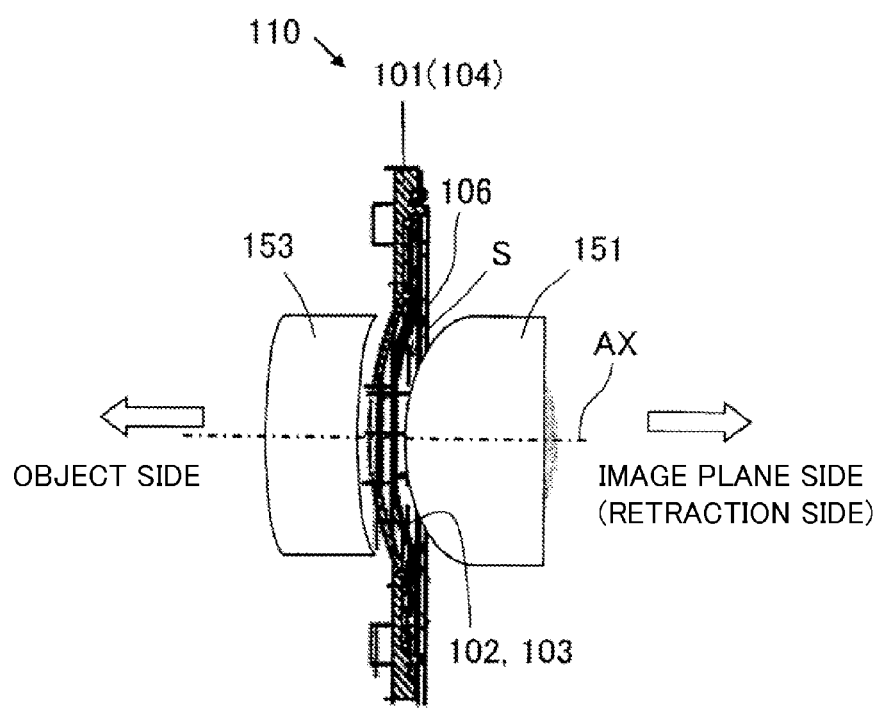
FIG. 11 is a side cross-sectional view illustrating the aperture stop apparatus of Embodiment 2.

As illustrated in FIG. 11, at least part of a lens 51 can be inserted into the concave space S. That is, according to this embodiment, it is possible to form the concave space S, into which at least part of the lens 51 can be inserted, on a radially inner side than the stop blades 103 without opening the stop blades 103 up to their fully opened state.

Moreover, forming the domical wall portions 102a in the driving ring 102 makes it possible to increase an opening diameter of the concave space S where the lens 51 is inserted, compared to a case where the driving ring is formed in a flat plate ring shape. That is, it is possible to increase a diameter of the lens 51 insertable into the concave space S.

The concave space S can be also said a space whose outer circumference is surrounded by blade surfaces of the stop blades 103. However, in this embodiment, the blade surfaces of the stop blades 103 do not directly face the concave space S, and the domical wall portion 102a of the driving ring 102 that surrounds the concave space S is interposed between the concave space S and the blade surface of the stop blade 103. It is noted that the domical wall portion 102a is not indispensable, and the blade surface of the stop blade 103 may directly face the concave space S by removing the domical wall portion 102a if the stop blades 103 can be stably guided in the opening/closing direction using a rail extending in the radial direction or the like.

Furthermore, also in this embodiment, as described in Embodiment 1 using FIG. 8, the one side tip of the cam boss portion 108 provided in the driving ring 102 (the one side is the side where the domical wall portion 102a and the stop blade 103 are convex) is located on an opposite side to the one side than the one side edge of the light-blocking portion 103a as a stop portion, regardless of the rotate position of the stop blade 103.

Embodiment 4

FIG. 14 illustrates an aperture stop apparatus as a light-quantity control apparatus that is Embodiment 4 of the present invention. In FIG. 14, common components to those in Embodiment 3 are denoted by the same reference numerals as those in Embodiment 3, and description thereof is omitted. Although Embodiment 3 employs the configuration that controls the light-quantity by rotating the light-blocking blades so as to change the size of the stop aperture, this embodiment employs a configuration that controls the light-quantity by rotating a single neutral density (ND) blade as a light-quantity control blade whose light-quantity control potion is formed by an ND filter.

A single supporting boss portion (convex portion) 107 is formed in the base plate 101 in this embodiment. Similar to Embodiment 3, the center axis of the supporting boss portion 107 has a tilt with respect to the optical axis direction. In addition, a single cam boss portion 108 is formed in the guide surface 102c (dome portion 102a) of the driving ring 102 in this embodiment. Similar to Embodiment 3, the center axis of the cam boss portion 108 has a tilt with respect to the optical axis direction so as to extend in the direction normal to the guide surface 102c. The base plate 101 and the driving ring 102 are used also in Embodiments 5 and 6 described below.

An ND blade 123 includes a ND filter portion 123a, a supported portion 123b supported rotatably with respect to the base plate 101 and the driving ring 102, and an intermediate portion that connects the ND filter portion 123a and the supported portion 123b. A hole portion (concave portion) 123c into which the supporting boss portion 107 formed in the base plate 101 is inserted is formed in the supported portion 123b. The ND blade 123 is rotatable about the supporting boss portion 107 and the hole portion 123c with respect to the base plate 101 and the driving ring 102. In addition, a cam groove portion 123d in which the cam boss portion 108 formed in the driving ring 102 is inserted and with which the cam boss portion 108 is engaged is formed in the ND blade 123. Therefore, when the driving ring 102 is rotated, the cam boss portion 108 moves along the cam groove portion 123d, and thereby the ND blade 123 is rotated as illustrated in FIGS. 14A and 14B.

The ND blade 123 is rotated between a position where the ND filter portion 123a covers the entire fixed apertures formed in the base plate 101 and the driving ring 102 as illustrated in FIG. 14A (FIG. 14A shows only the second fixed aperture 112 of the driving ring 102) and a position where the ND filter portion 123a is perfectly retracted from an area facing the fixed apertures as illustrated in FIG. 14B, thereby controlling a quantity of light passing though the fixed apertures.

The ND filter portion 123a is formed in a curved surface shape (for example, in a spherical surface shape) having approximately the same curvature as that of the guide surface 102c of the domical wall portion 102a of the driving ring 102. For this reason, when the ND blade 123 is rotated, the ND filter portion 123a moves along (that is, by being guided by) the guide surface 102c.

Also in this embodiment, a tilt of the supported portion 123b (and the intermediate portion) of the ND blade 123 toward the optical axis direction with respect to the aperture plane of each fixed aperture provides a concave space formed on a radially inner side than the ND blade 123, having a depth from a supported portion (123b) side to an ND filter portion (123a) side in the optical axis direction and facing each fixed aperture. In addition, forming the domical wall portion 102a in the driving ring 102 makes it possible to increase the opening diameter of the concave space S where a lens is inserted, compared to a case where the driving ring is formed in a flat plate ring shape. This also applies to Embodiments 5 and 6 described below.

Although not illustrated in the drawings, similar to the cover plate 104 of Embodiment 3, the aperture stop apparatus of this embodiment has a cover plate to form a blade room for housing the driving ring 102 and the ND blade 123 between the cover plate and the base plate 101. This also applies to Embodiments 5 and 6 described below.

Also in this embodiment, the one side tip of the cam boss portion 108 provided in the driving ring 102 (the one side is the side where the domical wall portion 102a and the ND blade 103 are convex) is located on the opposite side to the one side than the one side edge of the light-blocking portion 103a as a stop portion, regardless of the rotation position of the ND blade 103. This also applies to Embodiments 5 and 6 described below.

Embodiment 5

FIG. 15 illustrates an aperture stop apparatus as a light-quantity control apparatus that is Embodiment 5 of the present invention. In FIG. 15, common components to those in Embodiment 3 are denoted by the same reference numerals as those in Embodiment 3, and description thereof is omitted. Although Embodiment 3 employs the configuration that controls the light-quantity by rotating the plurality of light-blocking blades so as to change the size of the stop aperture, this embodiment employs a configuration that controls the light-quantity by rotating a single stop blade having a stop aperture whose size is fixed.

A stop blade 133 includes a stop portion 133a as a light-quantity control portion having a small stop aperture 133f smaller than the fixed apertures formed in the base plate 101 and the driving ring 102 (in the drawings, only the second fixed aperture 112 of the driving ring 102 is illustrated), a supported portion 133b supported rotatably with respect to the base plate 101 and the driving ring 102, and an intermediate portion that connects the stop portion 133a and the supported portion 133b. A hole portion (concave portion) 133c into which the supporting boss portion 107 formed in the base plate 101 is inserted is formed in the supported portion 133b. The stop blade 133 is rotatable about the supporting boss portion 107 and the hole portion 133c with respect to the base plate 101 and the driving ring 102.

In addition, a cam groove portion 133d in which the cam boss portion 108 formed in the driving ring 102 is inserted and with which the cam boss portion 108 is engaged is formed in the stop blade 133. Therefore, when the driving ring 102 is rotated, the cam boss portion 108 moves along the cam groove portion 133d, and thereby the stop blade 133 is rotated as illustrated in FIGS. 15A and 15B. The stop blade 133 is rotated between a position where the small stop aperture 133f of the stop portion 133a faces the fixed apertures formed in the base plate 101 and the driving ring 102 as illustrated in FIG. 15A and a position where the stop portion 133a is perfectly retracted from an area facing the fixed apertures as illustrated in FIG. 15B, thereby controlling a quantity of light passing though the fixed apertures.

The stop portion 133a is formed in a curved surface shape (for example, in a spherical surface shape) having approximately the same curvature as that of the guide surface 102c of the domical wall portion 102a of the driving ring 102. For this reason, when the stop blade 133 is rotated, the stop portion 133a moves along (that is, by being guided by) the guide surface 102c.

Also in this embodiment, a tilt of the supported portion 133b (and the intermediate portion) of the stop blade 133 toward the optical axis direction with respect to the aperture plane of each fixed aperture provides a concave space formed on a radially inner side than the stop blade 133, having a depth from a supported portion (133b) side to a stop portion (133a) side in the optical axis direction and facing each fixed aperture.

Embodiment 6

FIG. 16 illustrates an aperture stop apparatus as a light-quantity control apparatus that is Embodiment 6 of the present invention. In FIG. 16, common components to those in Embodiment 3 are denoted by the same reference numerals as those in Embodiment 3, and description thereof is omitted. This embodiment employs a configuration that controls the light-quantity by rotating a single stop blade.

A stop blade 143 includes a light-blocking portion 143a to form a stop aperture, a supported portion 143b supported rotatably with respect to the base plate 101 and the driving ring 102, and an intermediate portion that connects the light-blocking portion 143a and the supported portion 143b. A hole portion (concave portion) 143c into which the supporting boss portion 107 formed in the base plate 101 is inserted is formed in the supported portion 143b. The stop blade 143 is rotatable about the supporting boss portion 107 and the hole portion 143c with respect to the base plate 101 and the driving ring 102.

In addition, a cam groove portion 143d in which the cam boss portion 108 formed in the driving ring 102 is inserted and with which the cam boss portion 108 is engaged is formed in the stop blade 143. Therefore, when the driving ring 102 is rotated, the cam boss portion 108 moves along the cam groove portion 143d, and thereby the stop blade 143 is rotated as illustrated in FIGS. 16A and 16B. The stop blade 143 is rotated between a position where the light-blocking portion 143a faces the fixed apertures formed in the base plate 101 and the driving ring 102 as illustrated in FIG. 16A and a position where the light-blocking portion 143a is perfectly retracted from an area facing the fixed apertures as illustrated in FIG. 16B, thereby controlling a quantity of light passing though the fixed apertures.

The light-blocking portion 143a is formed in a curved surface shape (for example, in a spherical surface shape) having approximately the same curvature as that of the guide surface 102c of the domical wall portion 102a of the driving ring 102. For this reason, when the stop blade 143 is rotated, the light-blocking portion 143a moves along (that is, by being guided by) the guide surface 102c.

Also in this embodiment, a tilt of the supported portion 143b (and the intermediate portion) of the stop blade 143 toward the optical axis direction with respect to the aperture plane of each fixed aperture provides a concave space formed on a radially inner side than the stop blade 143, having a depth from a supported portion (143b) side to a light-blocking portion (143a) side in the optical axis direction and facing each fixed aperture.

Embodiment 7

FIG. 17 illustrates a camera (a video camera or a still camera) as an optical apparatus in which the aperture stop apparatus 110 described in any one of Embodiments 3 to 6 is installed. As described in Embodiment 2, the camera includes the camera body 50, the plurality of lenses 51 and 53 constituting the image capturing optical system, and the image sensor 52. The controller 54 is constituted by a CPU or the like and controls operations of the aperture stop apparatus 110 (drivers 105) and the image sensor 52. The aperture stop apparatus 110 may have a shutter function.

In this camera, as described in Embodiment 3 with reference to FIG. 11, at least part (convex surface) of the lens 51 adjacently disposed to the aperture stop apparatus 110 in the optical axis direction can be inserted into the concave space S of the aperture stop apparatus 110. FIG. 11 illustrates a state where an entrance (first fixed aperture 106) for the lens 51 into the concave space S is opened toward an image plane side and a most part of the lens 51 adjacently disposed on the image plane side of the aperture stop apparatus 110 is inserted into the concave space S. It is noted that the entrance of the concave space S may be directed toward an object side, and the lens 53 disposed adjacently on an object side of the aperture stop apparatus 110 may be inserted into the concave space S.

Assuming that the domical wall portion 102a is formed in the driving ring 102, a size (inner diameter) of an opening serving as the entrance for the lens 51 into the concave space S is defined by a diameter of a circle passing through the supported portions 103b (supporting boss portions 107) of the stop blades 103 (113, 123, 133 or 143) or an inner diameter of the first fixed aperture 106 of the base plate 1 corresponding to the circle, which does not depend on a size of the stop aperture formed by the stop blades 103. Thus, even when the stop aperture is narrowed, it is possible to insert the lens 51 into the concave space S without setting the stop aperture to a fully opened aperture diameter or increasing the size of the stop aperture to a larger size than that of the fully opened aperture diameter. Therefore, it is possible to eliminate necessity of increasing the maximum diameter of the stop aperture depending on the outer diameter of the lens 51, which avoids increase of the radial size of the aperture stop apparatus 110 capable of inserting the lens into its inner space.

In addition, FIG. 11 also illustrates a state that the convex surface (object side surface) of the domical wall portion 104a of the cover plate 104 of the aperture stop apparatus 110 is disposed close to the concave surface (image plane side surface) of the lens adjacently disposed on the object side of the aperture stop apparatus 110. In this manner, it is possible to dispose the stop blades 103 of the aperture stop apparatus 110 in a narrow space between the object side convex surface of the lens 51 and the image plane side concave surface of the lens 53.

In addition, as illustrated in FIG. 11, a lens barrel holding the image capturing optical system may be housed (retracted)

into the camera body in a state where the aperture stop apparatus 110 is close to the lenses 51 and 53 arranged on both sides thereof.

Furthermore, the aperture stop apparatus 110 may be installed in other optical apparatuses such as an interchangeable lens as well as the camera illustrated in FIG. 17.

According to the above embodiments, in the light-quantity control apparatus having the light-quantity control blade (stop blade or shutter blade), it is possible to form, inside the light-quantity control blade in the radial direction, a concave space into which a lens having a large diameter can be inserted. That is, it is possible to suppress a size increase of the light-quantity control apparatus in a radial direction and insert a lens having a large diameter into an inner side of the optical axis direction. Therefore, it is possible to reduce a size of the optical apparatus having the light-quantity control apparatus in the optical axis direction and miniaturize the optical apparatus in the radial direction.

In the light-quantity control apparatus according to the second aspect of the invention, it is possible to prevent a first shutter blade and a second shutter blade having a curved surface shape or a bent shape from being caught with each other in the shutter close operation. Therefore, it is possible to smoothly perform a shutter operation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A light-quantity control apparatus provided with a light-passing aperture, comprising:
    a base member;
    a stop blade including a stop portion to change a quantity of light passing through the light-passing aperture and a stop blade-supported portion rotatably supported with respect to the base member;
    a shutter blade having a shutter portion to block the light passing through the light-passing aperture and a shutter blade-supported portion rotatably supported with respect to the base member; and
    a driving member disposed between the shutter blade and the stop blade and rotating with respect to the base member around the light-passing aperture to rotate the stop blade,
    wherein, when a direction orthogonal to an aperture plane of the light-passing aperture is defined as an optical axis direction, and a direction orthogonal to the optical axis direction is defined as a radial direction,
    the stop blade and the shutter blade respectively have tilts in the stop blade-supported portion and the shutter blade-supported portion toward a same one side in the optical axis direction with respect to the aperture plane so that the stop portion and the shutter portion are respectively distant from the stop blade-supported portion and the shutter blade-supported portion in the optical axis direction, the driving member has a shape concave toward the one side from its outer circumferential side portion to its inner circumferential side portion, and thereby a concave space facing the light-passing aperture is formed inside in the radial direction than the stop blade, the shutter blade and the driving member.

2. A light-quantity control apparatus according to claim 1, wherein the apparatus includes, as the shutter blade, a first shutter blade and a second shutter blade,
    the first and second shutter blades each have a curved surface shape or a bent shape so that the tilt with respect to the aperture plane is reduced from the shutter blade-supported portion to the shutter portion,
    the first shutter blade is disposed so as to overlap the second shutter blade on an opposite side to the concave space, and
    a curvature of the curved surface shape of the first shutter blade or a bend angle of the bent shape of the first shutter blade with respect to an extension of its shutter blade-supported portion is larger than that of the second shutter blade.

3. A light-quantity control apparatus according to claim 1, wherein the shutter blade, the driving member and the stop blade are arranged in order from a concave space side to the one side,
    the stop blade is provided with a cam groove portion,
    the driving member is provided with a cam boss portion engaging with the cam groove portion to rotate the stop blade by rotation of the driving member, and
    a tip of the cam boss portion on the one side is located on an opposite side to the one side further than an edge of the stop portion on the one side, regardless of a rotation position of the stop blade.

4. A light-quantity control apparatus according to claim 1, further comprising:
    a driver including an actuator to rotate the driving member,
    wherein the driver is installed to the base member so as to protrude to the one side from the base member.

5. A light-quantity control apparatus according to claim 1, wherein each of the stop blade-supported portion of the stop blade and the shutter blade-supported portion of the shutter blade is rotated about an axis tilted with respect to the optical axis direction.

6. An optical apparatus comprising:
    a body of the optical apparatus; and
    an optical system including a lens and the light-quantity control apparatus according to claim 1.

7. A light-quantity control apparatus provided with a light-passing aperture, comprising:
    a base member;
    a stop blade including a stop portion to change a quantity of light passing through the light-passing aperture and a stop blade-supported portion rotatably supported with respect to the base member; and
    a first shutter blade and a second shutter blade each having a shutter portion to block the light passing through the light-passing aperture and a shutter blade-supported portion rotatably supported with respect to the base member,
    wherein, when a direction orthogonal to an aperture plane of the light-passing aperture is defined as an optical axis direction, and a direction orthogonal to the optical axis direction is defined as a radial direction,
    the stop blade and the first and second shutter blades respectively have tilts in the stop blade-supported portion and the shutter blade-supported portions toward a same one side in the optical axis direction with respect to the aperture plane so that the stop portion and the shutter portions are respectively distant from the stop blade-supported portion and the shutter blade-supported portions in the optical axis direction, and thereby a concave space facing the light-passing aperture is formed inside in the radial direction than the stop blade and the first and second shutter blades,
    the first and second shutter blades each have a curved surface shape or a bent shape so that the tilt with respect to the aperture plane is reduced from the shutter blade-supported portion to the shutter portion, the first shutter blade is disposed so as to overlap the second shutter blade on an opposite side to the concave space, and a curvature of the curved surface shape of the first shutter blade or a bend angle of the bent shape of the first shutter blade with respect to an extension of its shutter blade-supported portion is larger than that of the second shutter blade.

8. A light-quantity control apparatus according to claim 7, further comprising:

a driving member rotating with respect to the base member around the light-passing aperture to rotate the stop blade, wherein the first and second shutter blades, the driving member and the stop blade are arranged in order from a concave space side to the one side, the stop blade is provided with a cam groove portion, the driving member is provided with a cam boss portion engaging with the cam groove portion to rotate the stop blade by rotation of the driving member, and a tip of the cam boss portion on the one side is located on an opposite side to the one side further than an edge of the stop portion on the one side, regardless of a rotation position of the stop blade.

9. A light-quantity control apparatus according to claim 7, further comprising:

a driver including an actuator to rotate the driving member, wherein the driver is installed to the base member so as to protrude to the one side from the base member.

10. A light-quantity control apparatus according to claim 7, wherein each of the stop blade-supported portion of the stop blade and the shutter blade-supported portions of the first and second shutter blades is rotated about an axis tilted with respect to the optical axis direction.

11. An optical apparatus comprising:
a body of the optical apparatus; and
an optical system including a lens and the light-quantity control apparatus according to claim 7.

12. A light-quantity control apparatus provided with a light-passing aperture, comprising:

a base member;

a light-quantity control blade including a light-quantity control portion to change a quantity of light passing through the light-passing aperture and a supported portion rotatably supported with respect to the base member; and a driving member rotating with respect to the base member around the light-passing aperture to rotate the light-quantity control blade, wherein, when a direction orthogonal to an aperture plane of the light-passing aperture is defined as an optical axis direction, and a direction orthogonal to the optical axis direction is defined as a radial direction, the light-quantity control blade have tilts in the supported portion toward one side in the optical axis direction with respect to the aperture plane so that the light-quantity control portion is distant from the supported portion in the optical axis direction, the driving member has a shape concave toward the one side from its outer circumferential side portion to its inner circumferential side portion, and thereby a concave space facing the light-passing aperture is formed inside in the radial direction than the light-quantity control blade and the driving member.

13. A light-quantity control apparatus according to claim 12, wherein the driving member and the light-quantity control blade are arranged in order from a concave space side to the one side, the light-quantity control blade is provided with a cam groove portion, the driving member is provided with a cam boss portion engaging with the cam groove portion to rotate the light-quantity control blade by rotation of the driving member, and a tip of the cam boss portion on the one side is located on an opposite side to the one side further than an edge of the light-quantity control portion on the one side, regardless of a rotation position of the light-quantity control blade.

14. A light-quantity control apparatus according to claim 12, wherein the light-quantity control blade has a curved surface shape or a bent shape so that the tilt with respect to the aperture plane is reduced from the supported portion to the light-quantity control portion.

15. A light-quantity control apparatus according to claim 12, wherein the supported portion is rotated is rotated about an axis tilted with respect to the optical axis direction.

16. A light-quantity control apparatus according to claim 12, wherein a plurality of the light-quantity control blades are provided, and the light-quantity control blades are rotated so as to change a size of the light-passing aperture to control the quantity of the light.

17. A light-quantity control apparatus according to claim 12, wherein one light-quantity control blade is provided in which a stop aperture is formed, and the light-quantity control blade is rotated so as to move the stop aperture with respect to the light-passing aperture to control the quantity of the light.

18. A light-quantity control apparatus according to claim 12, wherein the light-quantity control portion of the light-quantity control blade is formed by an ND filter, and the light-quantity control blade is rotated so as to move the ND filter with respect to the light-passing aperture to control the quantity of the light.

19. A light-quantity control apparatus according to claim 12, further comprising a driver including an actuator to rotate the driving member, wherein the driver is installed to the base member so as to protrude to the one side from the base member.

20. An optical apparatus comprising:
a body of the optical apparatus; and
an optical system including a lens and the light-quantity control apparatus according to claim 12.

21. A light-quantity control apparatus provided with a light-passing aperture, comprising:

a light-quantity control blade disposed facing a convex surface of a lens and formed in a curved surface shape; and a driving member to drive the light-quantity control blade, wherein the driving member has a shape concave in an optical axis direction, and thereby the driving member forms a concave space which allows insertion of a portion including the convex surface of the lens thereinto.

22. An optical apparatus comprising:
a body of the optical apparatus; and
an optical system including a lens and the light-quantity control apparatus according to claim 21.

* * * * *